United States Patent
Roberts et al.

(10) Patent No.: US 12,232,449 B2
(45) Date of Patent: Feb. 25, 2025

(54) FLEXIBLE CATCHER ASSEMBLY FOR BERRY HARVESTER

(71) Applicant: Oxbo International Corporation, Byron, NY (US)

(72) Inventors: Kevin M. Roberts, Custer, WA (US); Thomas S. Kok, Blaine, WA (US)

(73) Assignee: Oxbo International Corporation, Byron, NY (US)

( * ) Notice: Subject to any disclaimer, the term of this patent is extended or adjusted under 35 U.S.C. 154(b) by 49 days.

(21) Appl. No.: 17/350,953

(22) Filed: Jun. 17, 2021

(65) Prior Publication Data

US 2022/0007581 A1    Jan. 13, 2022

Related U.S. Application Data

(60) Provisional application No. 63/040,984, filed on Jun. 18, 2020.

(51) Int. Cl.
*A01D 46/26*  (2006.01)
*A01D 46/28*  (2006.01)

(52) U.S. Cl.
CPC ........... *A01D 46/264* (2013.01); *A01D 46/28* (2013.01)

(58) Field of Classification Search
CPC ................. A01D 46/264; A01D 46/28; A01D 2046/262; B29C 44/18; B29C 44/186; B29C 44/334; B29C 2045/1715
See application file for complete search history.

(56) References Cited

U.S. PATENT DOCUMENTS

| | | | |
|---|---|---|---|
| 80,466 A * | 7/1868 | S. F. Emerson | A01D 46/26 56/329 |
| D28,987 S | 7/1898 | Dingee | |
| 3,325,984 A * | 6/1967 | Christie | A01D 46/28 56/330 |

(Continued)

FOREIGN PATENT DOCUMENTS

WO    2019009746    1/2019

OTHER PUBLICATIONS

Prior Art, Kokan 500S, Air Jet Berry Harvester, Harvesting All Berries Easily Without Physical Contact and Damages, http://airharvesters.com/en/ , printed Jul. 19, 2018, five pages.

(Continued)

*Primary Examiner* — Thomas B Will
*Assistant Examiner* — Julia C Tran
(74) *Attorney, Agent, or Firm* — Merchant & Gould P.C.

(57) ABSTRACT

An over the row berry harvester provides flexible cushioned elements and surfaces to limit bruising of the fruit harvested. A chassis defines a picking tunnel that passes over rows of plants. A picking system removes fruit from the plants as the harvester moves along the rows. A catching system configured to receive fruit removed from the plants. The catching system includes groups of catch assemblies with soft surfaces on each side of the picking tunnel, each of the catch assemblies at least partially overlapping adjacent catch assemblies. Each of the catch assemblies has a lightweight frame with an aperture and a membrane over molded to bond to the frame and extend across the aperture. The harvest also includes soft surfaces assemblies with membranes stretched between edge frame elements.

13 Claims, 29 Drawing Sheets

(56) References Cited

U.S. PATENT DOCUMENTS

| | | | |
|---|---|---|---|
| 3,531,925 A | 10/1970 | Vines | |
| 3,538,694 A * | 11/1970 | Holloway | A01D 46/28 56/330 |
| 3,543,486 A | 12/1970 | Bull | |
| 3,601,965 A * | 8/1971 | Kaessbohrer | A01D 46/28 56/329 |
| 3,656,282 A | 4/1972 | Rauth | |
| 3,690,054 A | 9/1972 | De Carlo | |
| 3,822,537 A * | 7/1974 | Sell | A01D 46/28 56/330 |
| 4,157,642 A * | 6/1979 | Butler | A01D 46/26 56/329 |
| 4,259,833 A * | 4/1981 | Mohn | A01D 46/28 56/330 |
| 4,464,888 A | 8/1984 | Burton | |
| 4,491,225 A * | 1/1985 | Baillod | B65D 81/075 206/583 |
| 5,092,113 A * | 3/1992 | Turunen | A01D 46/28 193/7 |
| 5,109,657 A * | 5/1992 | DeVries | A01D 46/28 56/330 |
| 5,181,373 A * | 1/1993 | Littau | A01D 46/28 56/330 |
| 5,341,630 A | 8/1994 | Littau | |
| 5,647,194 A * | 7/1997 | Scott | A01D 46/28 56/330 |
| D399,854 S | 10/1998 | Pearson | |
| 6,093,358 A * | 7/2000 | Schiewe | B29C 44/18 264/273 |
| 7,083,039 B2 | 8/2006 | Schloesser | |
| D601,174 S | 9/2009 | TerBeek | |
| 7,640,091 B2 | 12/2009 | Berg et al. | |
| 7,650,740 B2 * | 1/2010 | Pellenc | A01D 46/28 56/330 |
| 8,117,814 B2 * | 2/2012 | Sidhu | A01D 46/28 56/329 |
| 8,205,742 B2 | 6/2012 | TerBeek | |
| 9,504,201 B2 | 11/2016 | Schloesser | |
| 9,526,208 B2 * | 12/2016 | Zamirpour | A01D 46/26 |
| 9,642,309 B2 | 5/2017 | Schloesser et al. | |
| 9,668,417 B2 | 6/2017 | Korthuis et al. | |
| 9,750,188 B2 | 9/2017 | Takeda et al. | |
| 9,993,873 B2 * | 6/2018 | Kovalcik | B33Y 50/02 |
| 2004/0211668 A1 * | 10/2004 | Montminy | B29C 70/845 204/632 |
| 2007/0012018 A1 * | 1/2007 | Pellenc | A01D 46/28 56/328.1 |
| 2008/0148461 A1 * | 6/2008 | Guyuron | A61F 9/04 2/15 |
| 2008/0230462 A1 * | 9/2008 | Curtin | A47J 43/22 210/473 |
| 2008/0289582 A1 * | 11/2008 | Rutherford | A01K 77/00 119/245 |
| 2013/0269307 A1 * | 10/2013 | Pellenc | A01D 46/28 56/329 |
| 2013/0292394 A1 * | 11/2013 | Minnette | B65D 1/40 220/609 |
| 2014/0212560 A1 * | 7/2014 | Loehn | A47J 43/07 426/519 |
| 2014/0250853 A1 * | 9/2014 | Young | A01D 46/26 56/329 |
| 2017/0036403 A1 * | 2/2017 | Ruff | B33Y 40/00 |
| 2017/0042092 A1 * | 2/2017 | Takeda | A01D 46/264 |
| 2017/0231158 A1 * | 8/2017 | Williamson | A01D 46/264 56/330 |
| 2017/0231159 A1 * | 8/2017 | Williamson | A01D 46/26 56/330 |
| 2017/0238465 A1 * | 8/2017 | Bodtke | A01D 46/28 |
| 2018/0022044 A1 * | 1/2018 | Dulkiewicz | B33Y 50/02 425/375 |
| 2019/0208706 A1 | 7/2019 | Delran | |
| 2019/0281764 A1 | 9/2019 | Roberts | |
| 2020/0086569 A1 * | 3/2020 | MacNeil | B29C 64/379 |
| 2020/0253122 A1 * | 8/2020 | Kokanovic | A01D 46/26 |

OTHER PUBLICATIONS

Blueline Manufacturing Co., BH-100 Blueline Berry Harvester: Revolutionary Patented Technology, https://www.bluelinemfg.com/products/detail.html?itemid=56, printed Jul. 19, 2018, two pages.

Oxbo International Corporation, Berry Harvesters, Berry Brochure, http://www.oxbocorp.com/Products/Berries, eight pages.

Communication Relating to the Results of the Partial international Search received in corresponding PCT Application PCT/US2019/021603 dated Jun. 11, 2019.

Extended European Search Report received for corresponding application, dated Nov. 16, 2021, 8 pages.

* cited by examiner

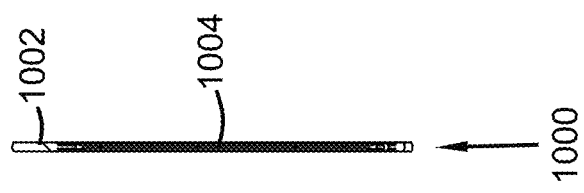
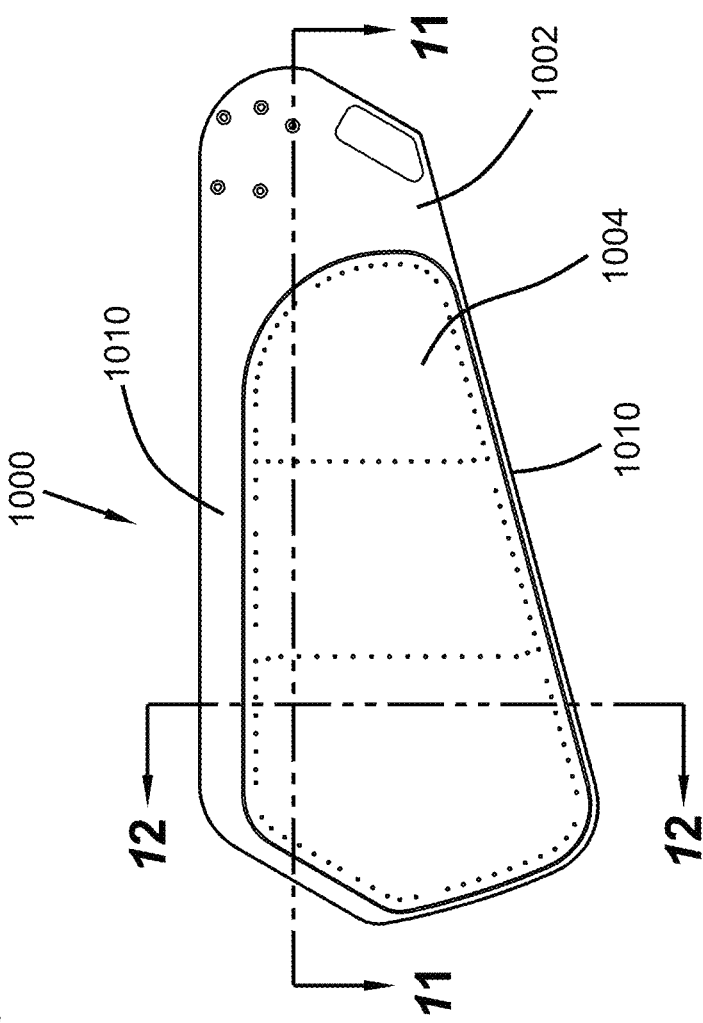

FLEXIBLE CATCHER ASSEMBLY FOR BERRY HARVESTER

BACKGROUND OF THE INVENTION

Field of the Invention

The present invention is directed to a berry harvester and in particular, to a berry harvester that provides flexible cushioned elements and surfaces to limit bruising of the fruit harvested.

Description of the Prior Art

Berry harvesters such as mechanical blueberry harvesters are widely used for harvesting berries. Such harvesters are widely successful for harvesting berries for the processed market in which berries may be frozen or processed into other forms and used in other fruit products other than fresh berries.

Manually harvested blueberries may be sold directly to the public as whole, fresh berries. Although such harvesting protects the fruit and limits damage such as bruising or squashed berries, the process is highly labor intensive and expensive. Moreover, there may be problems with finding sufficient labor to harvest all of the fruit through a short window of time when the fruit is sufficiently ripe and before the fruit is too ripe.

It is desirable to be able to consistently harvest fresh market quality berries with mechanical harvesters. As over half of the world's production of blueberries is non-processed and sold through fresh markets, there is ample demand for greater harvesting capacity of such fruit. Although mechanical harvesters have a much higher capacity and can harvest much faster than manual harvesting, they suffer from several problems that has limited their use for non-processed fresh market fruit. Mechanical harvesters may tend to bruise the fruit when the fruit is picked from the plant and transported to a storage container such as a lug or flat. At each time when a berry is dropped on a hard surface, macro bruising and micro bruising occurs. Although such bruising does not affect the quality of the processed berries, if the berries are harvested for the fresh market, such bruising can cause mold and fruit softening over a period of a few weeks. It can be appreciated that for berries that are harvested in South America, for example, and transported by ship to a market in North America, such a delay before arriving at market may occur. Therefore, mechanically harvested fruit has generally been considered to be inferior to the manually harvested fruit and has not been accepted as a fresh market quality product.

However, if the damage from being dropped were minimized or eliminated, mechanically harvested fruit would be acceptable as a fresh market quality product. Studies have indicated that fruit dropped on a hard surface covered with a foam substrate minimizes bruising, but if dropped more than 30-40 cm, bruising will still occur. However, if blueberries are dropped on a soft, padded surface or on a sheet that is not supported on the underside to allow flexing, such as with a trampoline type configuration, fruit dropped at over 1 meter is considered equivalent to manually harvested fruit. It can be appreciated that there are several areas in a mechanical fruit harvester that in which a drop occurs and which may be damaged. In particular, this may occur as the fruit is removed from the plants. To overcome such damage and eliminate hard surfaces, a system has been developed as shown in U.S. Pat. No. 9,750,188 to provide a soft surface.

It can be appreciated that the catch plates in this system are constructed in a manner than may still cause damage to the fruit as the fruit must roll off the catcher soft surface and a sharp edge created by the upper hoop tends to slice the fruit. In addition to having some exposed hard surfaces, such catchers are expensive to manufacture. As these catchers are often damaged and need replacement, costs multiply due to the large number of catchers used in over the row harvesters and for replacement catchers.

Moreover, although foam or cushioning over rigid surfaces may decrease the bruising that may occur if fruit falls onto such surfaces, foam layers have several drawbacks. Foam cushioning tends to have portions come loose when impacted. Moreover, foam cushioning may not be sufficiently durable and portions may wear away. In either of these situations, there is insufficient protection from fruit impacting a hard surface. Furthermore, the flexibility of foam layers cannot be adjusted and should more cushioning be required if there is bruising of the fruit falling on the surface or if the cushioning is too soft and fruit is not proceeding smoothly to conveyors, the foam must be replaced. If a trampoline surface have a resilient upper surface could be used, the tautness of the upper membrane could be adjusted to achieve the desired flexure.

It can therefore be seen that a system and method for mechanically harvesting fruit such as blueberries are needed that eliminates macro and micro bruising due to dropping. Such a system should provide for upper surfaces that are flexible and/or cushioned and/or flex and eliminate hard surfaces that may cause bruising when berries are dropped on them. Moreover, such elements should eliminate an exposed lip that may slice the fruit. Catchers and exposed panels should also have structural integrity, be lightweight, cost-effective, and easy to replace should damage occur. The present invention addresses these as well as other problems associated with mechanical berry harvesters.

SUMMARY OF THE INVENTION

The present invention is directed to a berry harvester having a fruit catching and transport system that has soft surfaces that soften impact and decrease bruising to fruit. Over the row berry harvesters have a chassis that defines a picking tunnel through which plants pass as the harvester moves along a row of plants, such as blueberry bushes. The harvester includes a picking assembly, such as rotary picking heads having orbital shaking picking battens or other systems that engage the branches and dislodge fruit. It has been found that such agitation/engagement with the plants is effective in removing ripe berries. The present invention is also adaptable to harvesters with other types of picking systems such as rotary picking heads with horizontally shaking picking battens, vertical shaking picking batten, or sway shaker systems that engage the plant canopy and shake the plant. The picking assembly of over the row harvesters is generally configured with the picking heads opposed on either side of the picking tunnel. As the harvester advances along the row of plants, the plants pass through the tunnel and are engaged by the picking assembly.

The fruit removed by the picking assembly falls onto a catching system. The catching system includes a first group of catch plate assemblies having a plurality of first catch plate assemblies, each of the plurality of first catch plate assemblies being pivotally mounted and overlapping adjacent first catch plate assemblies. A second group of catch plate assemblies includes a plurality of second catch plate assemblies, each of the plurality of second catch plate assemblies being pivotally mounted and overlapping adjacent second catch plate assemblies. The first group of catch plate assemblies is positioned on a first side of the picking tunnel and extends inward toward and along a centerline of the picking tunnel and the second group of catch plate assemblies is positioned on a second side of the picking tunnel opposite the first side of the picking tunnel and extends inward toward and along the centerline of the picking tunnel.

Each of the catch plate assemblies includes a planar lightweight monolithic frame having a mounting portion and forms an aperture. A membrane bonds directly to the frame and is made of elastomeric resilient material extending across the aperture and an upper surface of the planar framework. The membrane is supported solely by the frame. The frame includes an edge portion of reduced thickness surround the aperture and the elastomeric material of the membrane extends on opposed faces of the edge portion of reduced thickness.

In addition, the catching system includes a left first soft surface assembly extending along and spaced laterally outward in the picking tunnel from the first group of catch plate assemblies. The first soft surface assembly has a sloping upper surface including a membrane supported at edges of the membrane. Moreover, a right first soft surface assembly extends along and is spaced laterally outward in the picking tunnel from the second group of catch plate assemblies. The left first soft surface assembly and the right first soft surface assembly have a sloping upper surface with a membrane supported at edges of the membrane and tensioned by resilient cord elements. The tautness of the membrane is adjustable by using different resilient cored elements have a different length and/or elasticity.

The catching system further includes a soft surface assembly below each of the columns of beaters and has a resilient panel extending across an upper surface of the beaters' soft surface assembly, the resilient panel is sloped and supported at edges by a beaters' soft surface assembly frame.

Furthermore, the catching system may include a further soft surface assembly proximate each side of the picking tunnel and having a resilient panel extending across an upper surface of the further soft surface assembly. The resilient panel being supported at a slope at its edges by a frame.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

BRIEF DESCRIPTION OF THE DRAWINGS

Referring now to the drawings, wherein like reference letters and numerals indicate corresponding structure throughout the several views:

FIG. 10 is a bottom plan view of the catch plate assembly shown in FIG. 8;

FIG. 12 is a sectional view of the catch plate assembly taken along line 12-12 of FIG. 10;

DETAILED DESCRIPTION OF THE PREFERRED EMBODIMENT

Figure 1:
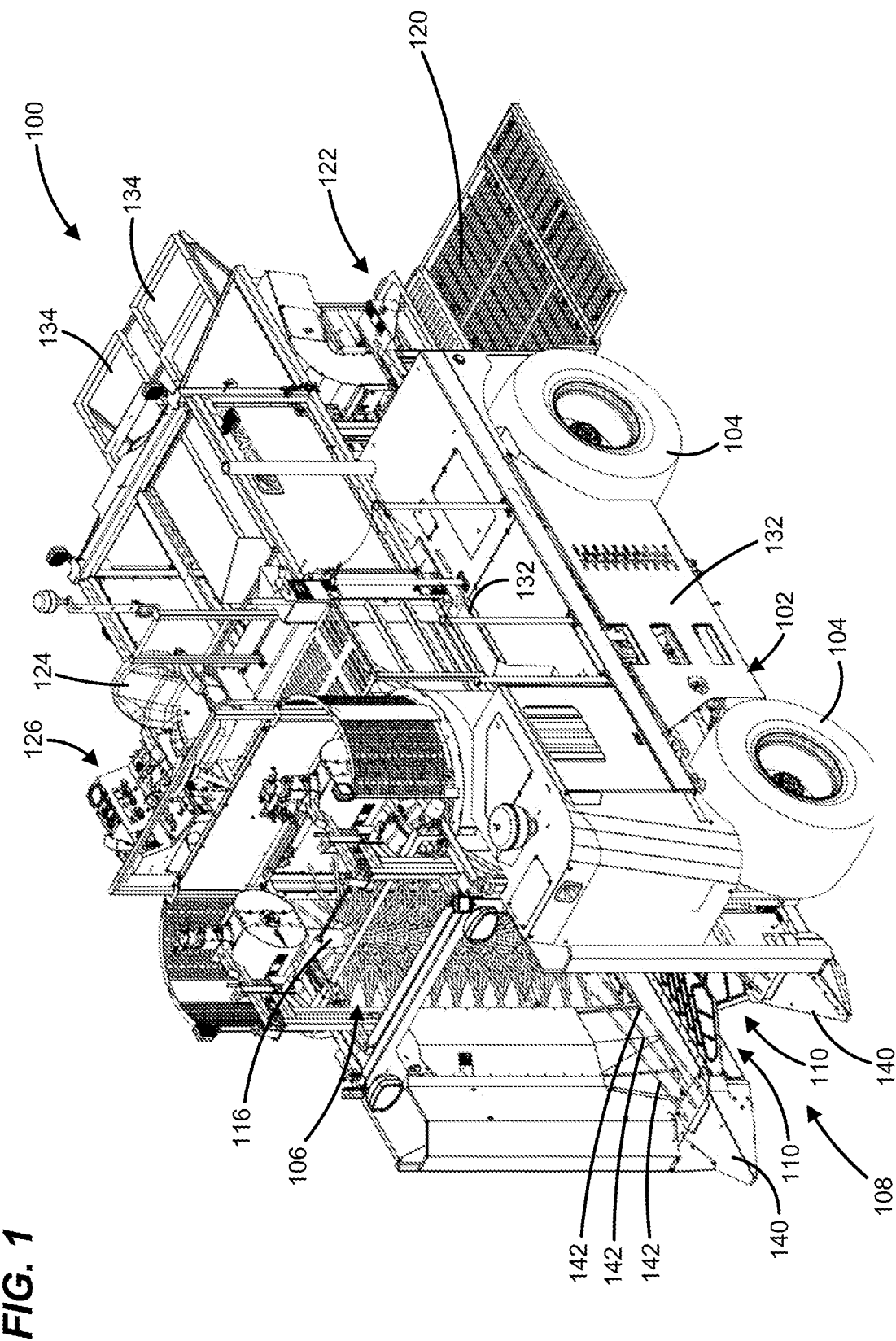
FIG. 1 is a perspective view of a first embodiment of a berry harvester according to the principles of the present invention.
Figure 2:
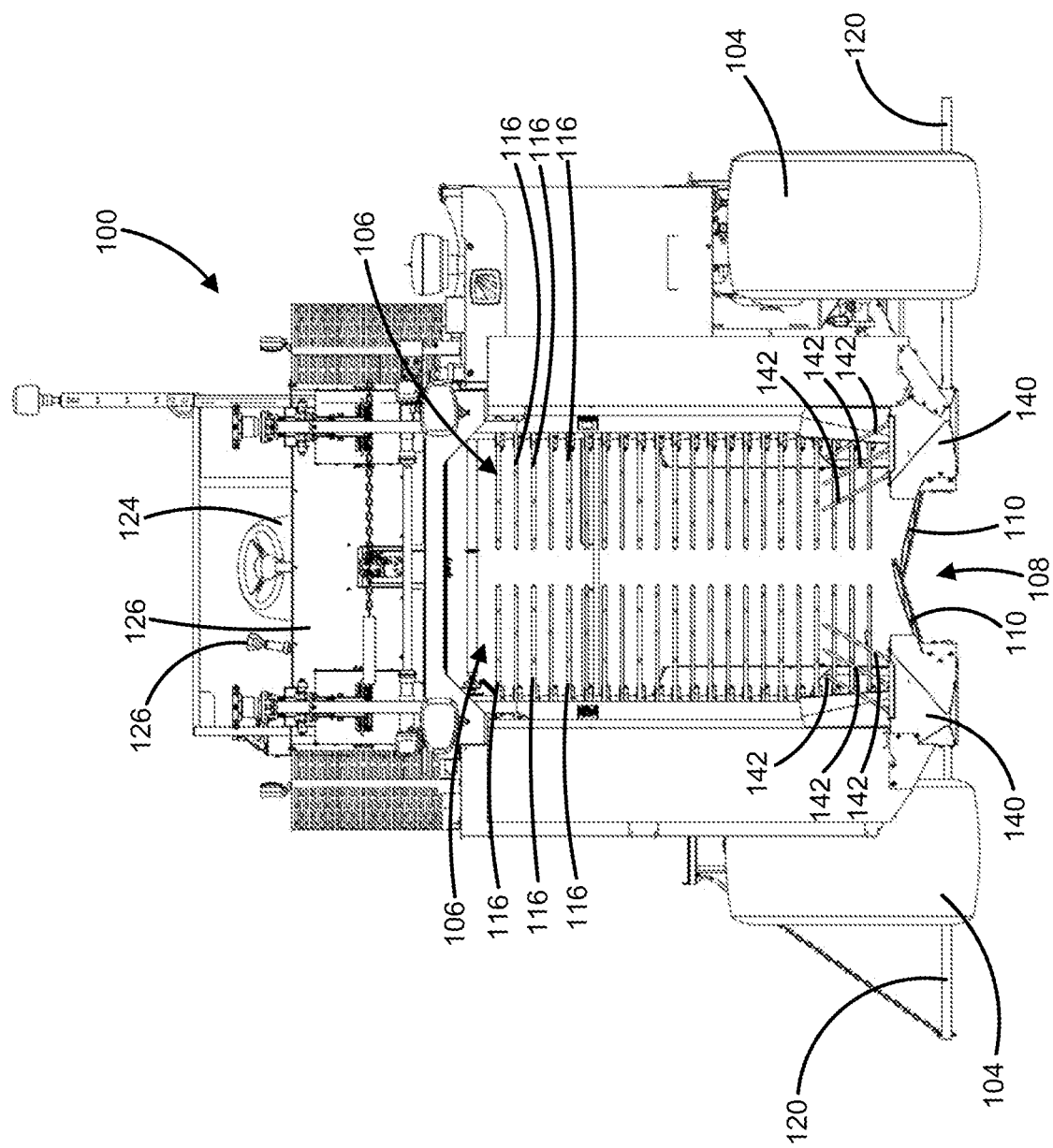
FIG. 2 is a front elevational view of the berry harvester shown in FIG. 1.
Figure 3:
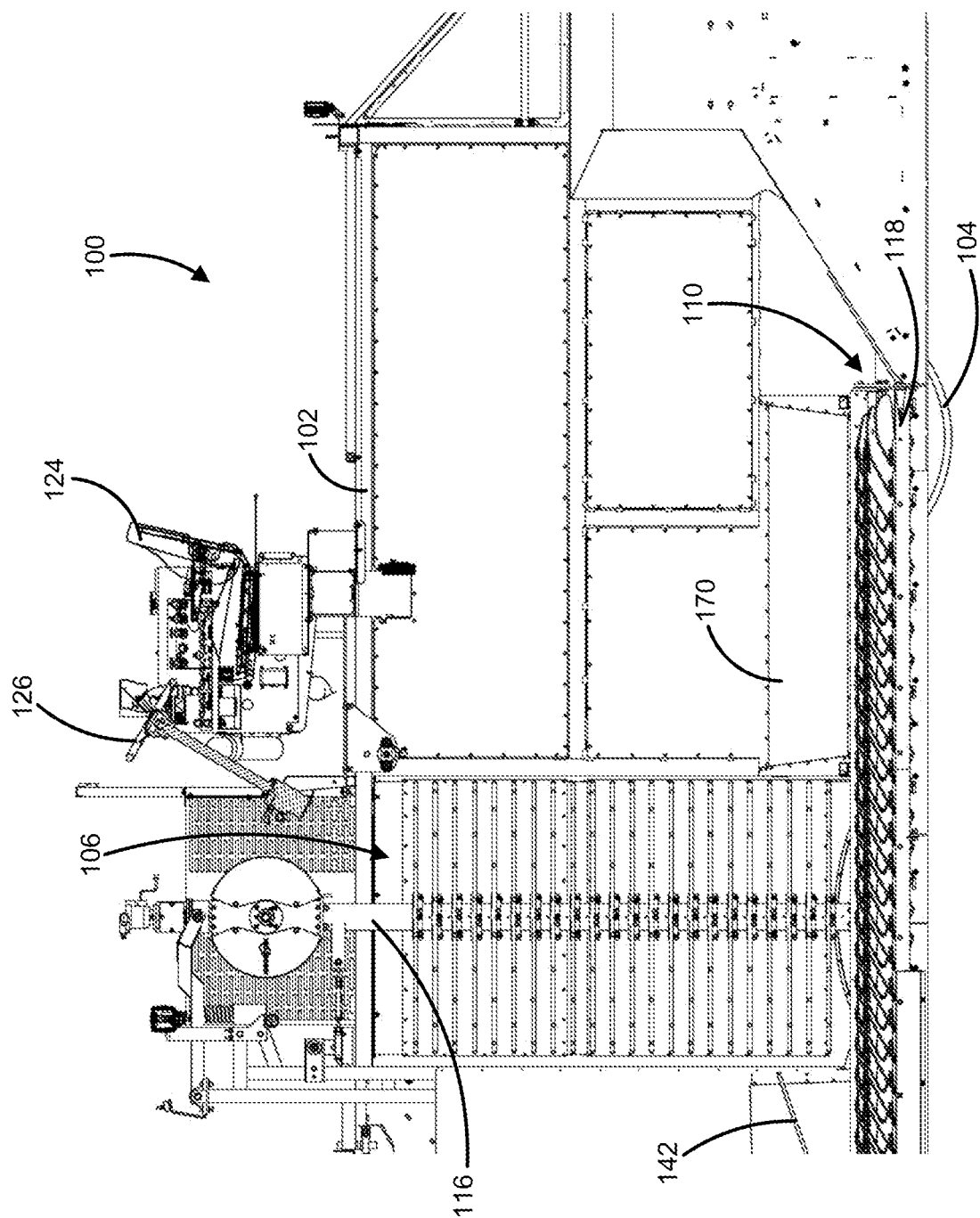
FIG. 3 is a sectional view showing a portion of the left side of the berry harvester shown in FIG. 1.
Figure 4:
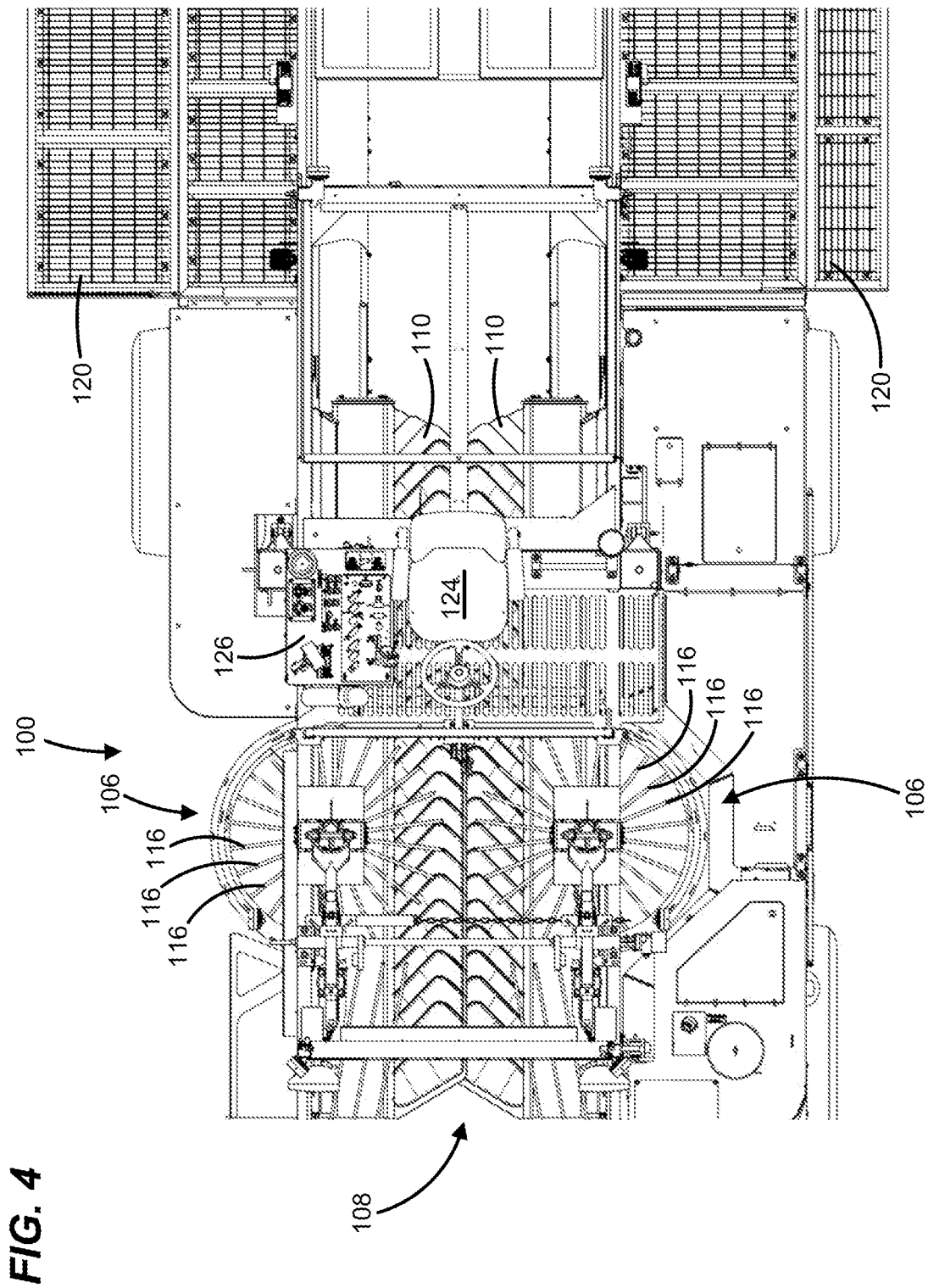
FIG. 4 is a top plan view of a portion of the berry harvester shown in FIG. 1.

Referring now to the drawings and in particular to FIGS. 1-5, there is shown a berry harvester, generally designated (100). The berry harvester may be an over the row type harvester with a chassis (102) forming a picking tunnel (108), such as shown for example in FIG. 2. The chassis is supported on wheels (104). The harvester (100) may include three wheels as shown or also four wheels, depending upon the application and requirements for its use. The harvester (100) includes a driver's seat (124) at an upper front portion of the harvester (100). Displays and controls (126) such as switches, a joystick and a steering wheel are easily accessible from the driver's seat (124).

The harvester (100) includes steps and ladders (132) to access various areas on the machine. Racks (134) provide for storing containers to be filled with berries. Decks (120) are typically at the rear of the machine and provide an area for storage and for workers to fill containers at a filling station (122) at each side of the harvester (100). The decks (120) may fold or include portions that fold to decrease the width of the harvester (100) for transport or storage.

In the embodiment shown, the harvester includes a picking assembly (106) with rotary picking heads (116) having orbital shaking picking battens. The battens project radially and extend into the plants to agitate the berry bushes as well as rotating and moving in an orbital type motion. It has been found that such agitation/engagement with the plants is effective in removing ripe berries while minimizing damage to the plants and harvested fruit. It can be appreciated however that the present invention is also adaptable to harvesters with other types of picking systems such as rotary picking heads with horizontal shaking battens or sway shakers. The picking assembly (106) is generally configured with the rotary picking heads opposed on either side of the picking tunnel (108). As the harvester (100) advances along rows of plants, the plants pass through and along the tunnel (108) and are engaged by the picking assembly (106) to remove the ripe berries.

Forward of the picking tunnel (108), low profile nose cones (140) provide a transitional surface to help to guide the fruiting canes or branches into the harvester tunnel (108). Moreover, cane lifters (142) aid in positioning lower branches of plants and lift them to be engaged by the orbital picking heads (116) for more efficient plant engagement. The fruit removed by the picking assembly (106) falls onto a catching system (110).

Figure 5:
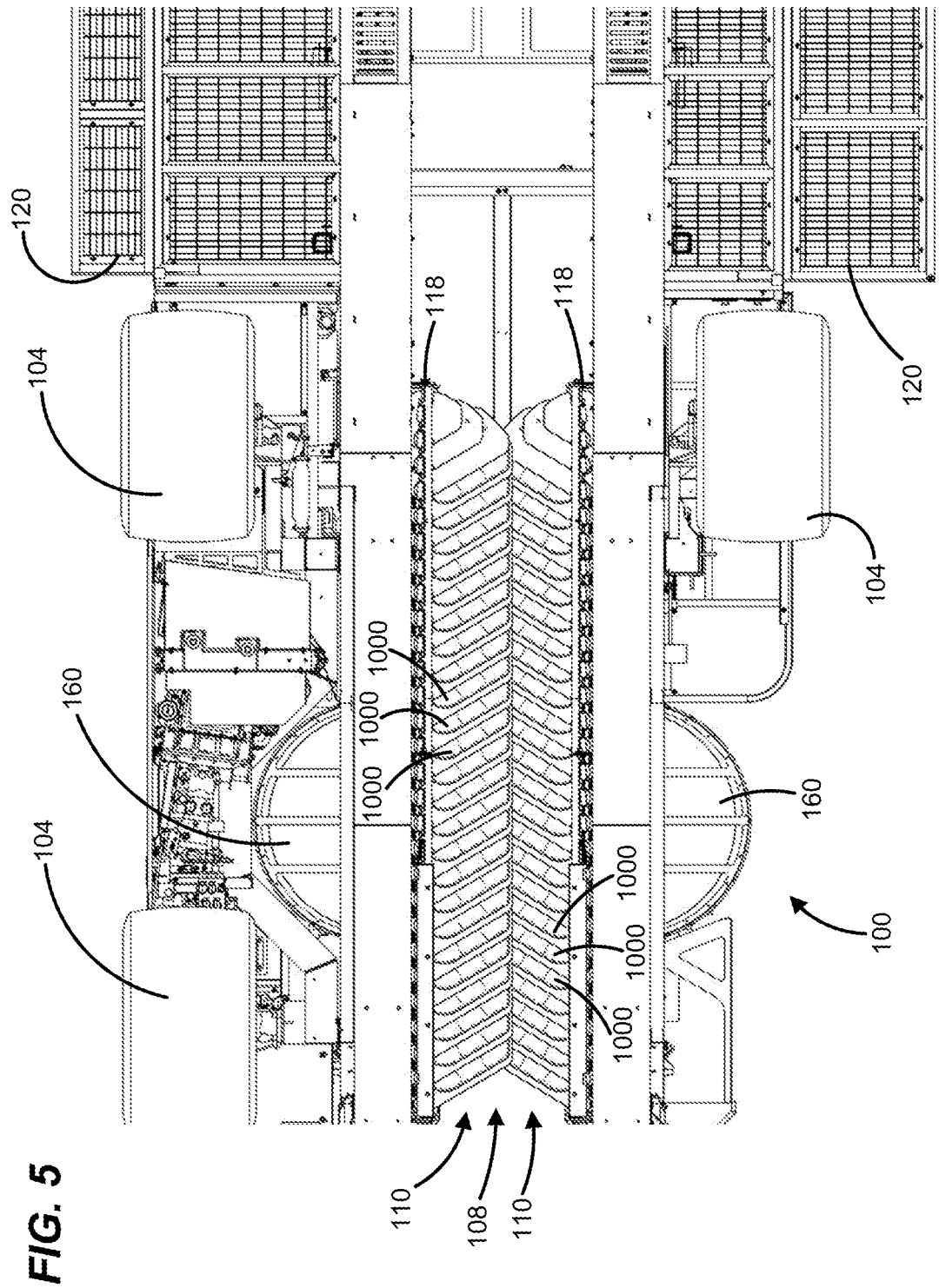
FIG. 5 is a bottom plan view of a portion of the berry harvester shown in FIG. 1.
Figure 6:
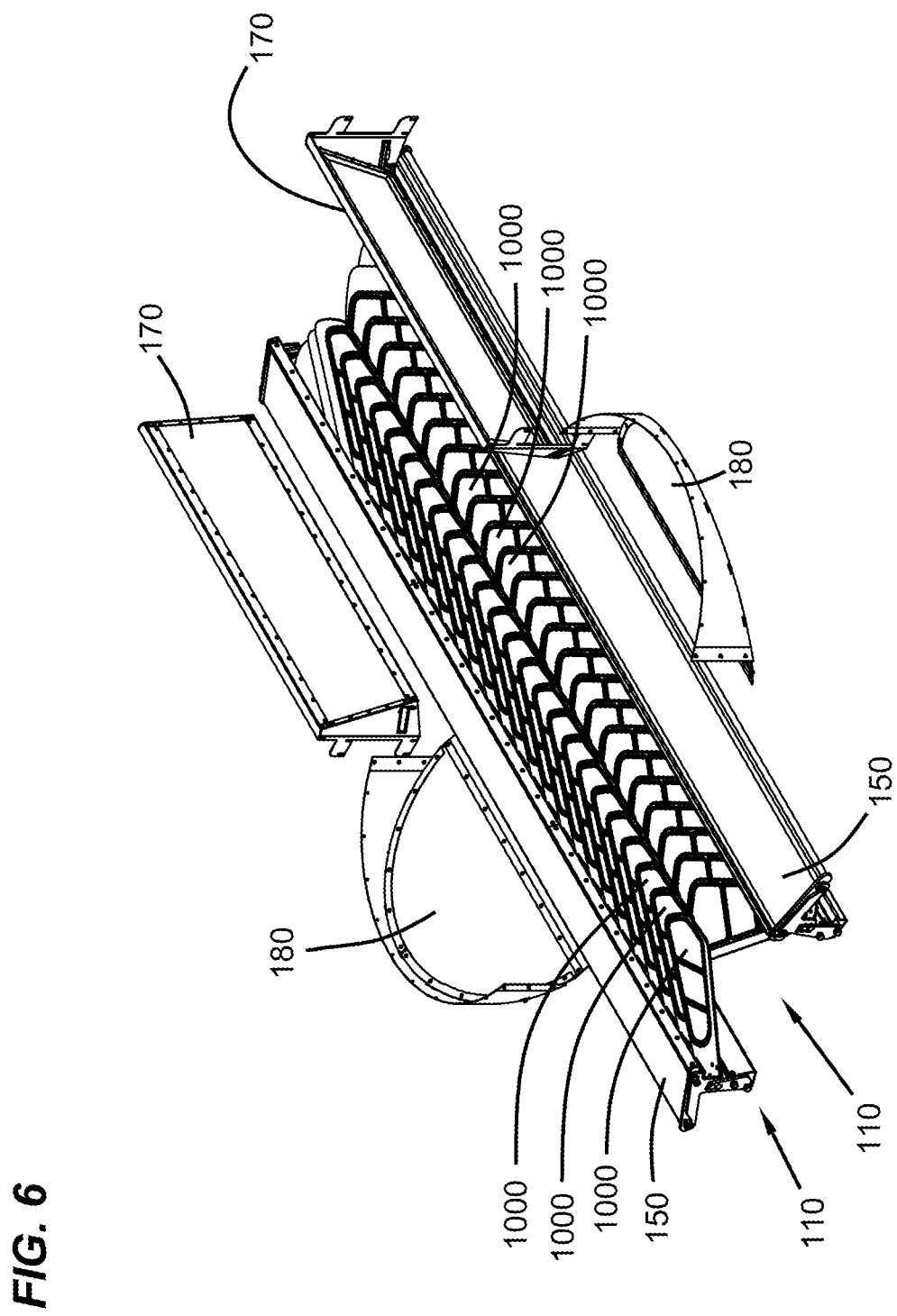
FIG. 6 is a front right perspective view of a portion of the tunnel and catching system for the berry harvester shown in FIG. 1.
Figure 7:
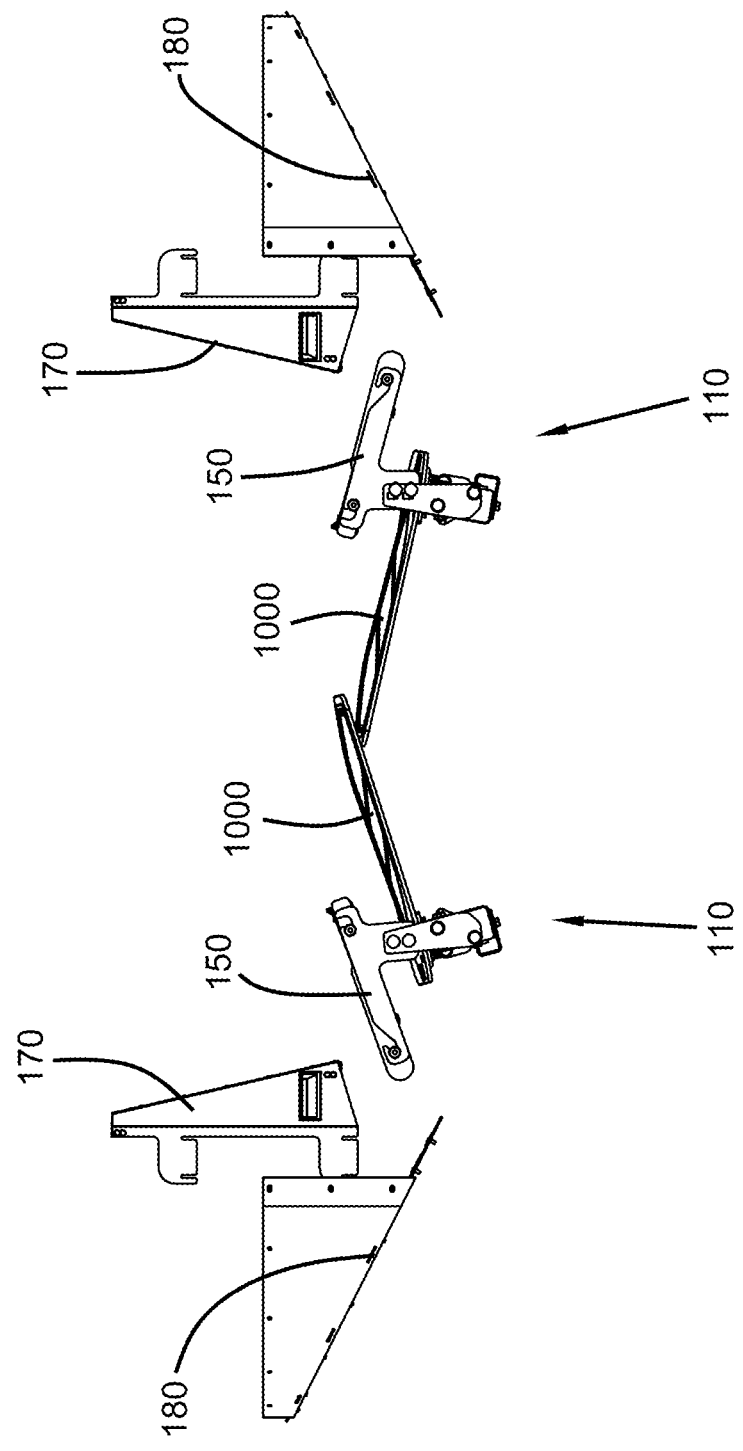
FIG. 7 is a front elevational view of the catching system shown in FIG. 6.
Figure 8:
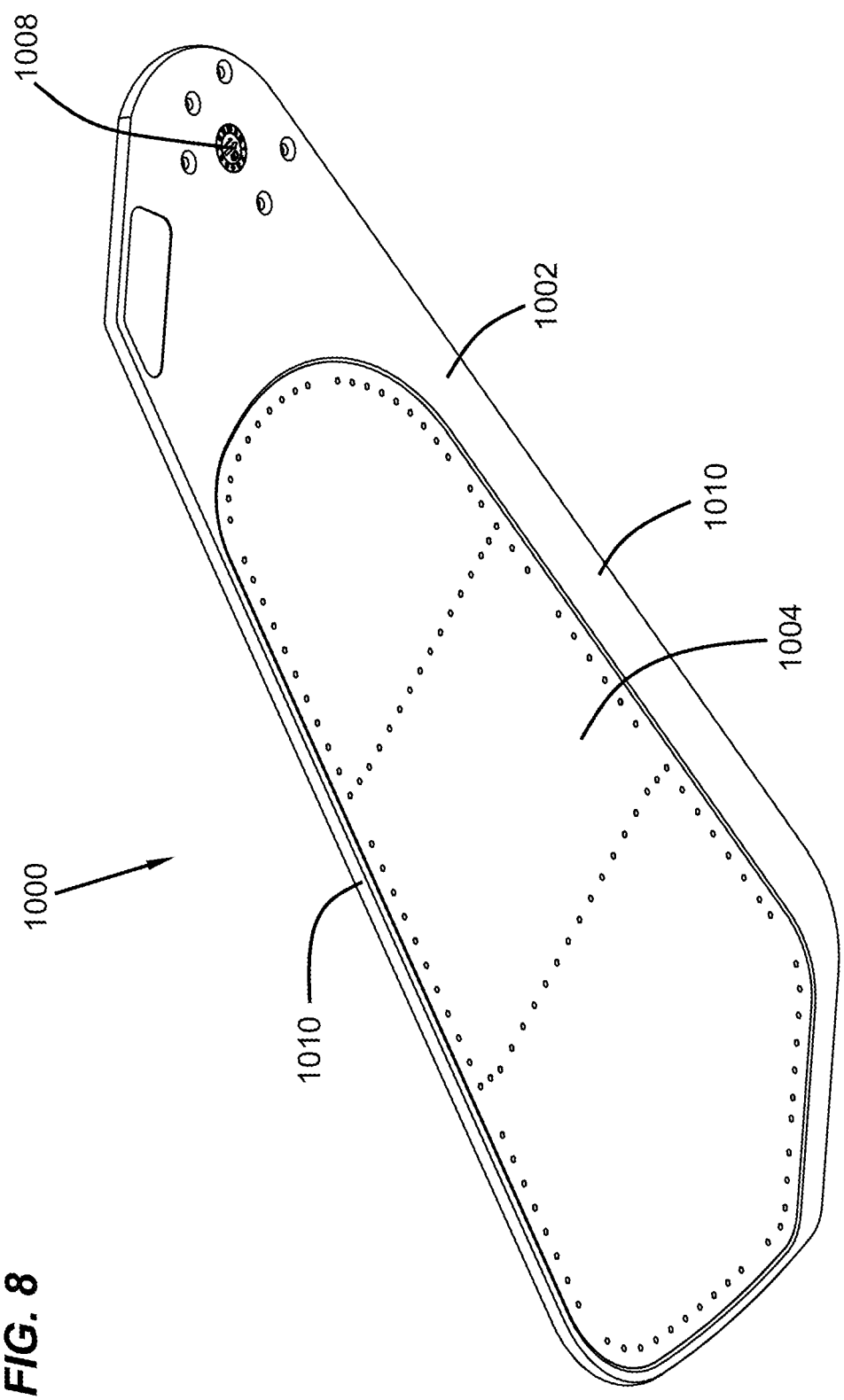
FIG. 8 is a top perspective view of a catch plate assembly for the berry harvester shown in FIG. 1.
Figure 9:
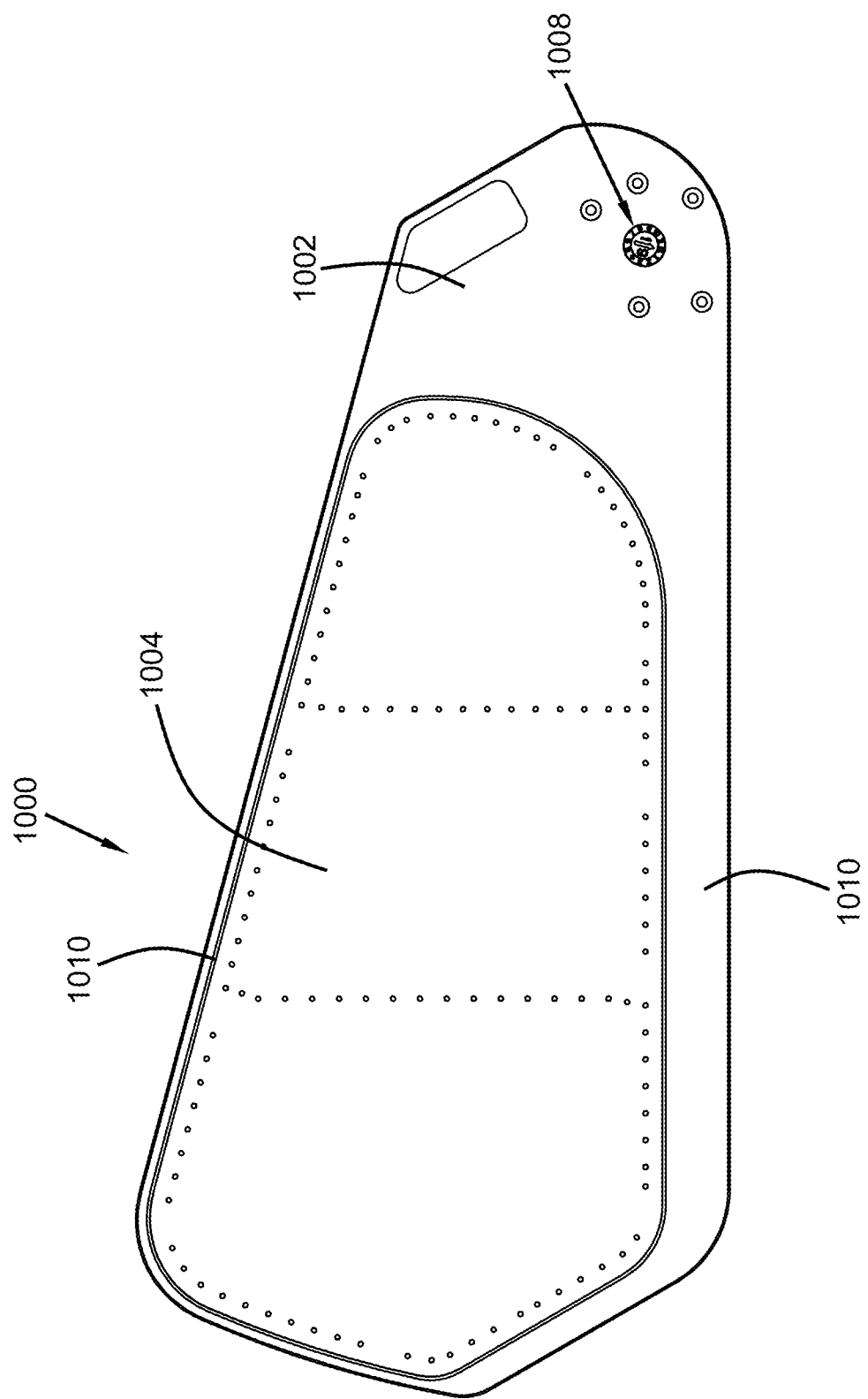
FIG. 9 is a top plan view of the catch plate assembly shown in FIG. 8.
Figure 11:
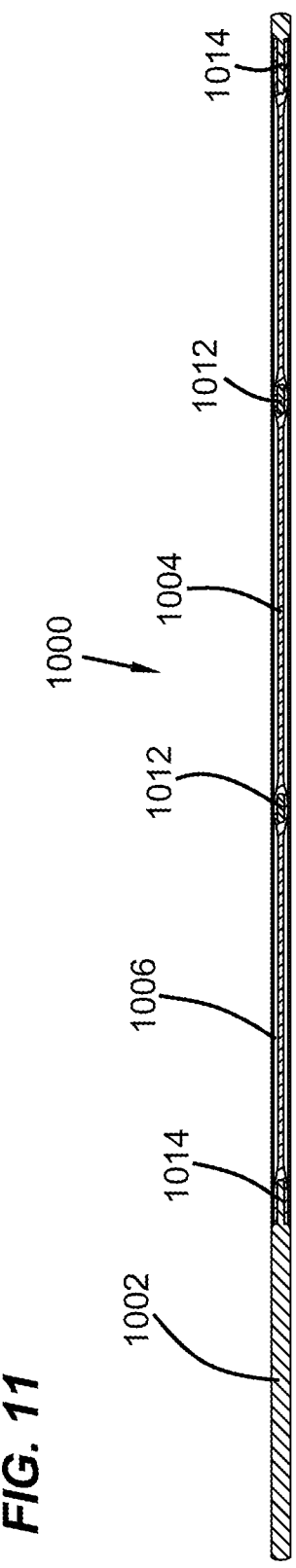
FIG. 11 is a sectional view of the catch plate assembly taken along line 11-11 of FIG. 10.

As shown, for example in FIGS. 5-7, the catching system (110) includes an opposed series of overlapping adjacent catch plate assemblies, such as catch plate assemblies (1000), mounted on each side of the tunnel (108). As shown most clearly in FIGS. 6 and 7, the picking tunnel (108) includes soft surface assemblies (150), (170) and (180) that are composed of a fabric membrane or other membrane materials that are stretched between supports at edges of the material to form a resilient trampoline type surface. The resilient surfaces of the assemblies (150, 170, 180) therefore provide a soft engagement surface for fruit that is flung against the surfaces. The resilient surfaces reduce the impact from the fruit impacting the surfaces and therefore reduce bruising of the fruit. By minimizing bruising, the quality of the berries harvested with such a mechanical harvester (100) may be marketed as fresh fruit.

In addition to providing a flexible surface onto which the fruit falls, creating an oblique angle to impact may also lessen the force from the fruit striking surfaces in the picking tunnel (108). As shown, for example, in FIGS. 4 and 5, lower portions (110, 150, 170, 180) of the picking tunnel (108) have a sloped upper surfaces. The upper surfaces provide a degree of resiliency or elasticity and absorb some of the force of the impact. The flexure of the surfaces combined with slope of the surfaces reduce or eliminate bruising to the berries due to impact after being dislodged from the bushes and falling. The slanting surfaces also help to direct the fruit to conveyors for transport for loading into trays or crates.

The catch plate assemblies (1000) extend generally toward the center of the picking tunnel (108). Each of the catch plate assemblies (1000) is generally configured as a substantially planar catch plate that pivotally mounts and is biased toward an extended position in which each of the catch plates (1000) extends generally inward and slightly rearward relative to the direction of travel, as shown in FIGS. 1 and 3-7. Moreover, individual rotational mounting allows the plate-like catch assemblies (1000) to rotate or pivot further backward and outward to follow around the berry bushes as the harvester (100) advances. The catch plates (1000) generally pivot out of the way while engaging the plants and then are biased back to their overlapping position. It can be appreciated that catch plates (1000) are mounted so that the catch plate assemblies (1000) upper surfaces have a slight slope that facilitates fruit rolling from the catch plate assemblies (1000) onto the conveyors. Moreover, the catch plate assemblies (1000) are configured to slightly nest with adjacent assemblies and partially overlap one another, both along the center line and from front to rear over adjacent catching assemblies, as shown for example in FIGS. 4, 5 and 7. The catch plate assemblies (1000) extend inward from a lower portion at each side of the picking tunnel (108), forming a peak where the ends of the catch plates (1000) slightly overlap in the center of the tunnel. With the overlapping configuration, fruit cannot fall between the catch plate assemblies (1000) and with the slightly sloped surface, fruit that falls onto the catch plate assemblies (1000) rolls outward in the tunnel onto conveyors (118). The conveyors then transport the fruit to the filling stations (122).

In some embodiments, the harvester (100) may include additional conveyors or may include fans and/or a cleaning station to remove debris away from the harvested berries.

It can further be appreciated that the catch plate assemblies (1000) for the catching system (110) include upper surfaces that lessen the impact and therefore the damage to the fruit. As shown in FIGS. 8-14, the catch plate assembly (1000) includes a plate type frame (1002) and a flexible trampoline type membrane (1004) extending across a substantial portion of the frame (1002) in a trampoline like arrangement. The framework (1002) includes an outer ring (1010) that defines an aperture or a series of adjacent apertures (1006) extending through the plane of the catch plate assembly (1000) from an upper face to a lower face. Support ribs (1012) extend across the aperture and provide additional support to the frame (1002) and the membrane (1004). The frame (1002) may also be configured without ribs (1012) and only include an outer ring (1010) surrounding a single aperture (1006) with the membrane (1004) spanning across the entire aperture. The frame (1002) may be made of lightweight rigid or semi rigid materials such as Nylon or Polycarbonate. The frame (1002) provides sufficient support for the membrane (1004) while also allowing a limited flexure so as not to break or to become permanently bent from engagement with fruit plants or other obstacles. The framework (1002) is preferably a monolithic molded element and has rounded edges so that the fruit is not sliced if should the fruit fall on an exposed edge of the frame (1002). The catch plate assembly (1000) also includes a mounting portion (1008) to attach to a pivot allowing the assemblies to rotate, as occurs when engaging a plant. The catch plate assembly (1000) is wider proximate the aperture or apertures (1006) than at the mounting portion.

Figure 13:
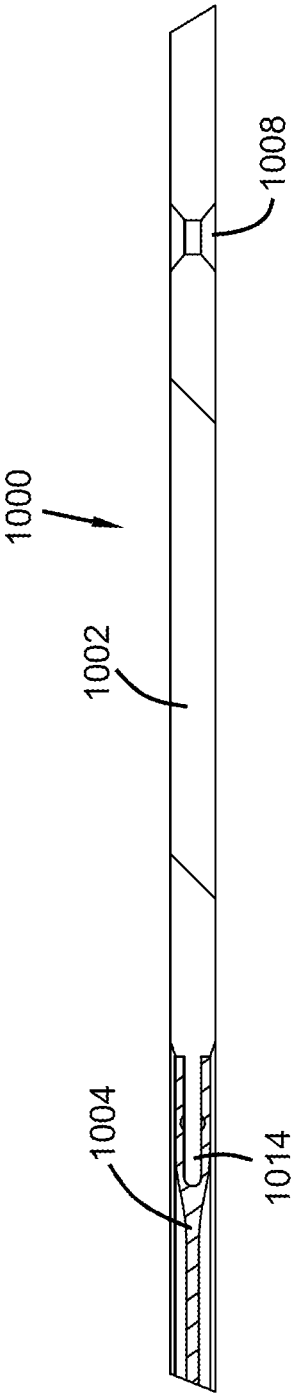
FIG. 13 is a detail sectional view of the catch plate assembly shown in FIG. 11.
Figure 14:
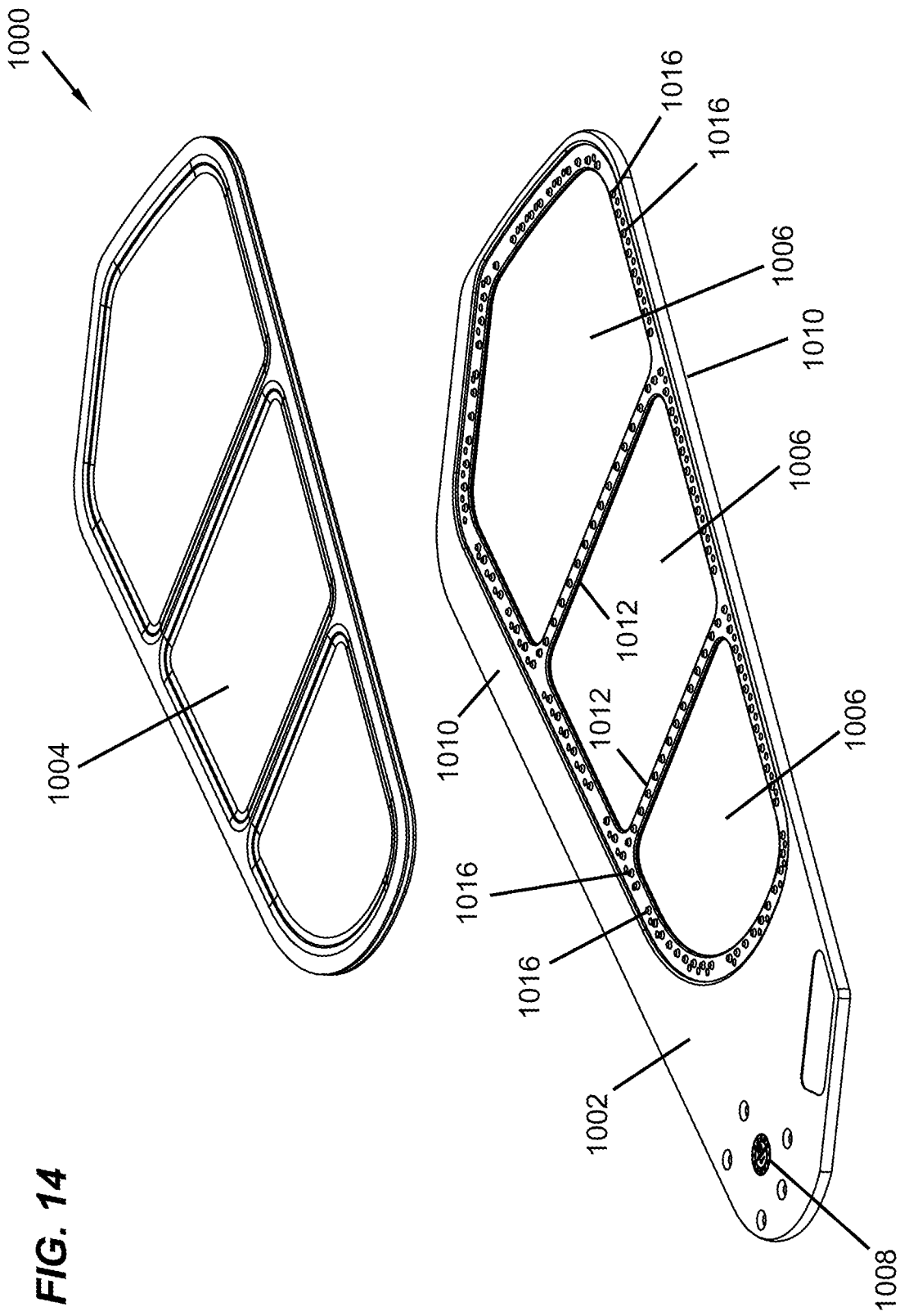
FIG. 14 is an exploded perspective view of the catch plate assembly shown in FIG. 8.
Figure 15:
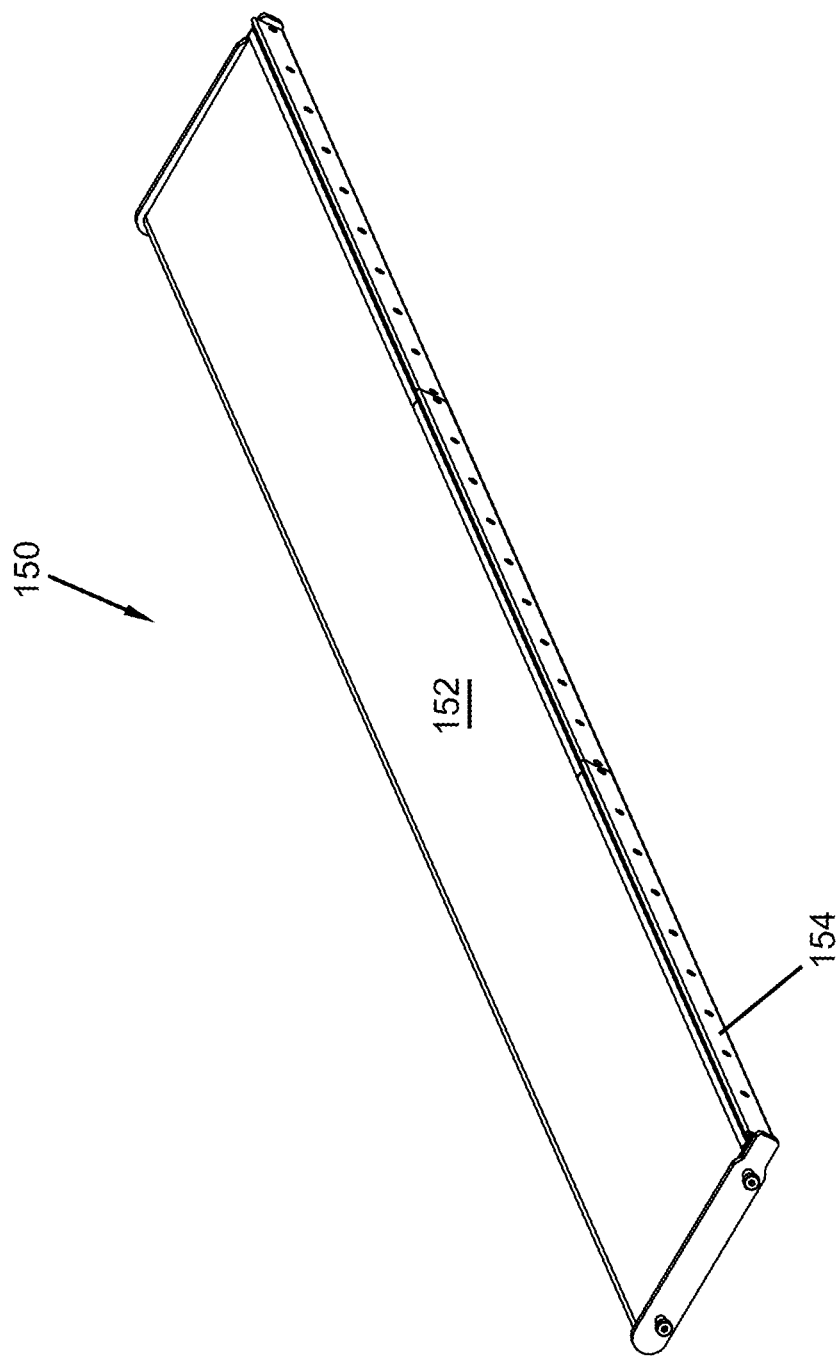
FIG. 15 is a top perspective view of a resilient panel assembly for the catching system shown in FIG. 6.
Figure 16:
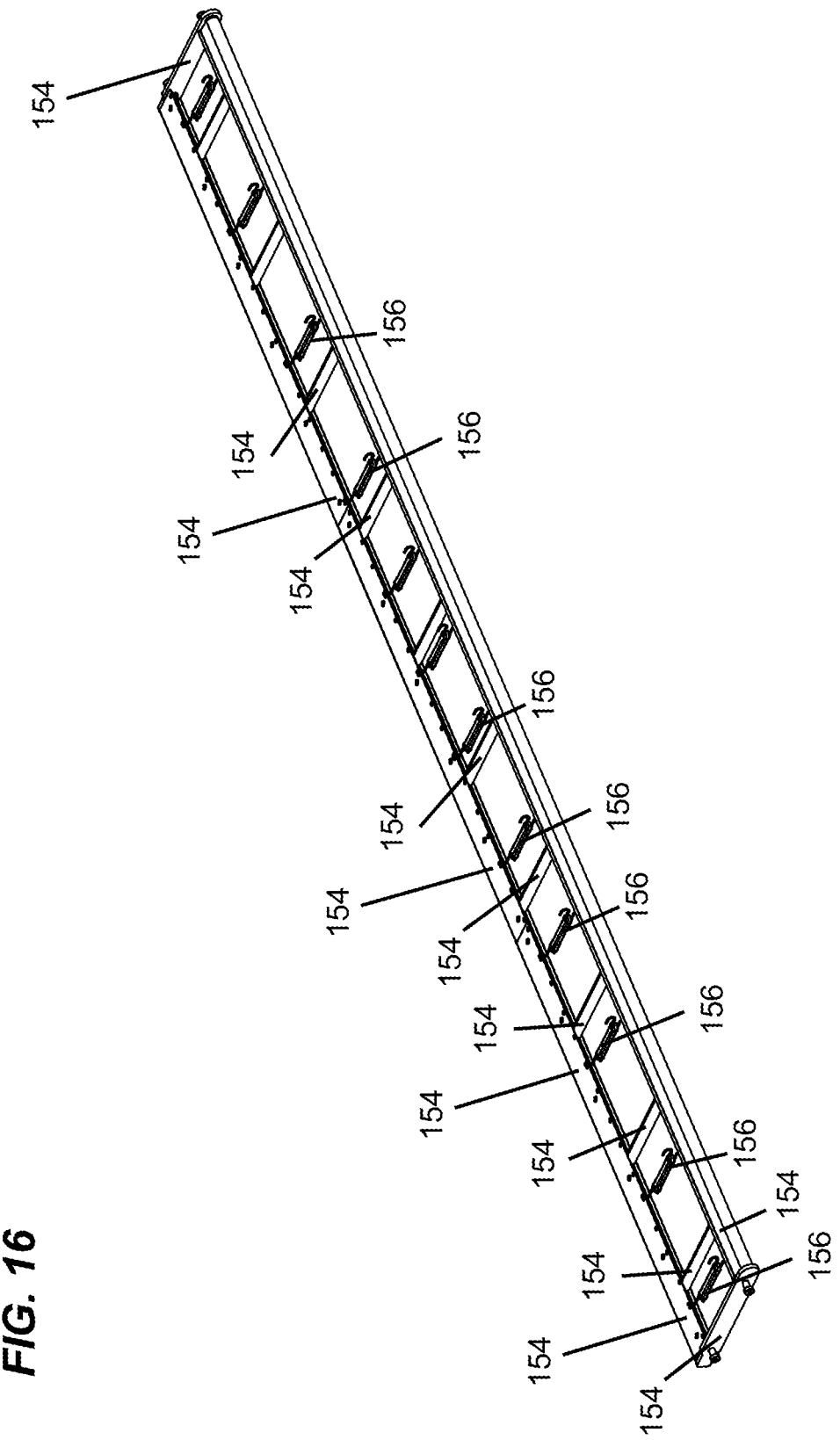
FIG. 16 is a bottom perspective view of the resilient panel assembly shown in FIG. 15.
Figure 17:
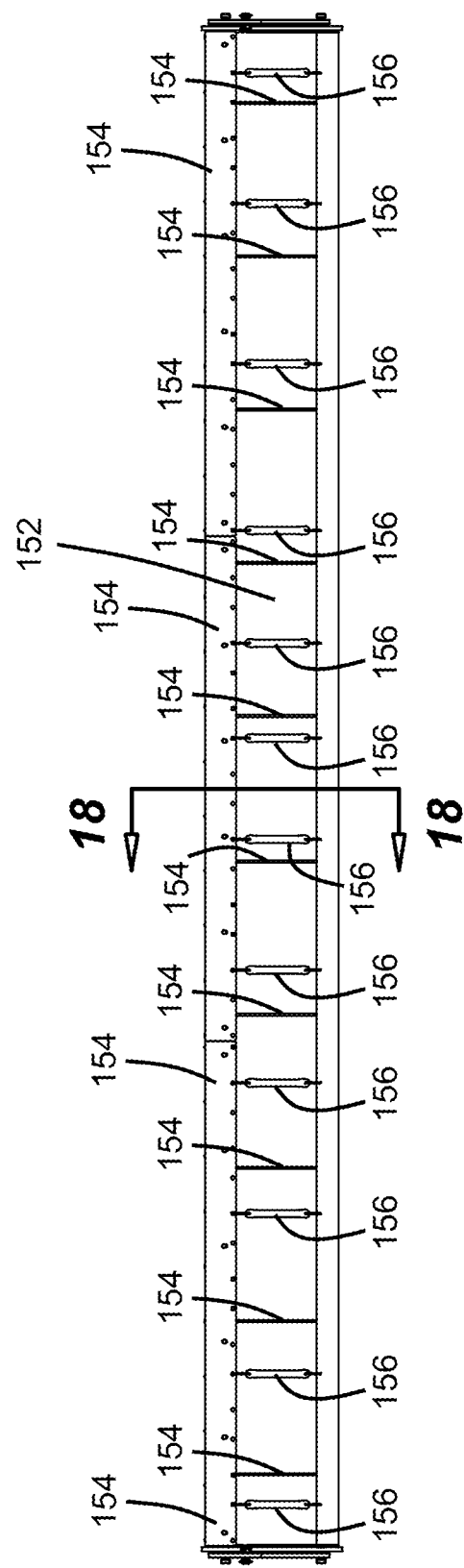
FIG. 17 is a bottom perspective view of the resilient panel assembly shown in FIG. 15.
Figure 18:
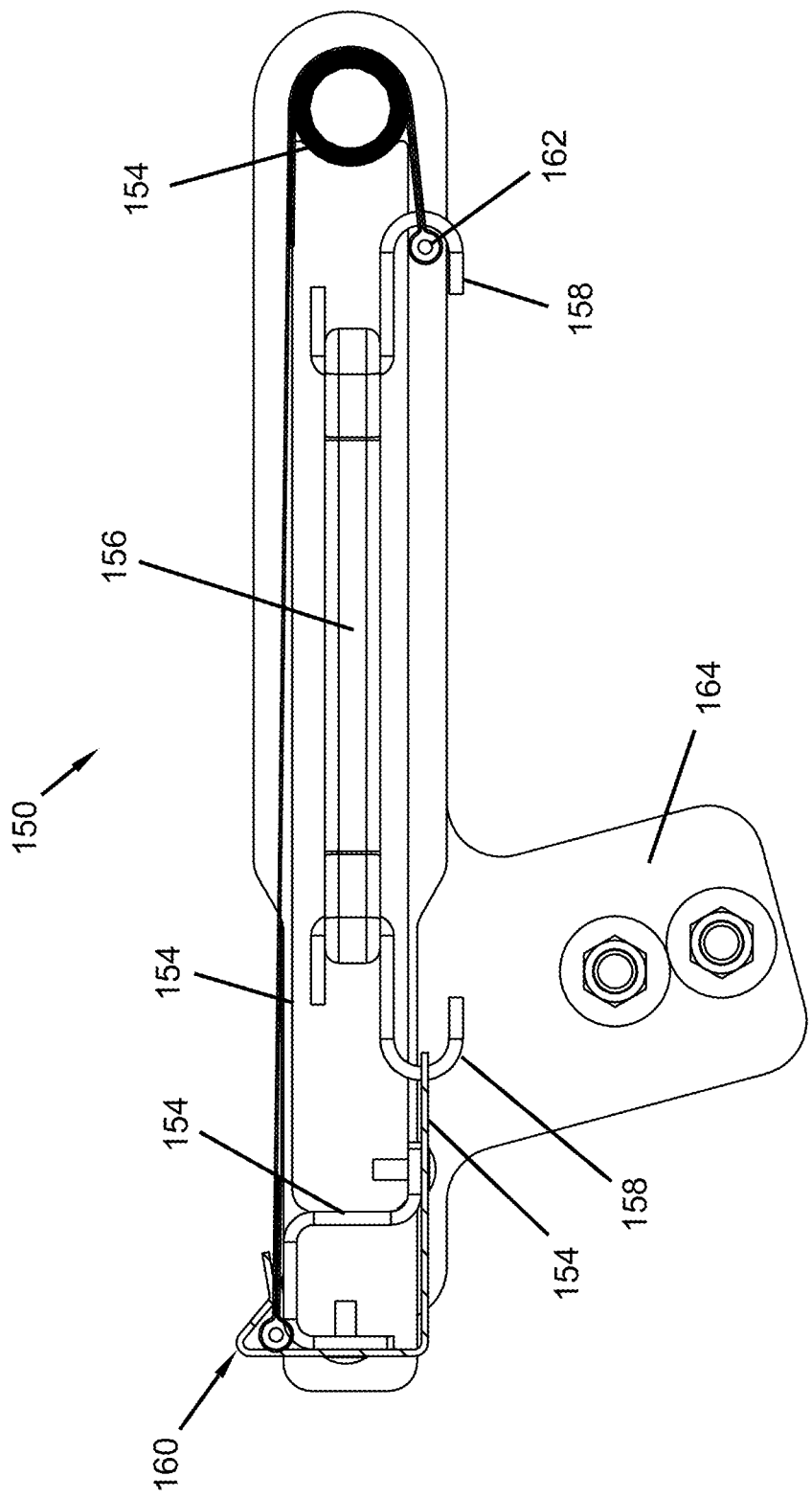
FIG. 18 is an end sectional view of the of the resilient panel assembly taken along line 18-18 of FIG. 17.
Figure 19:
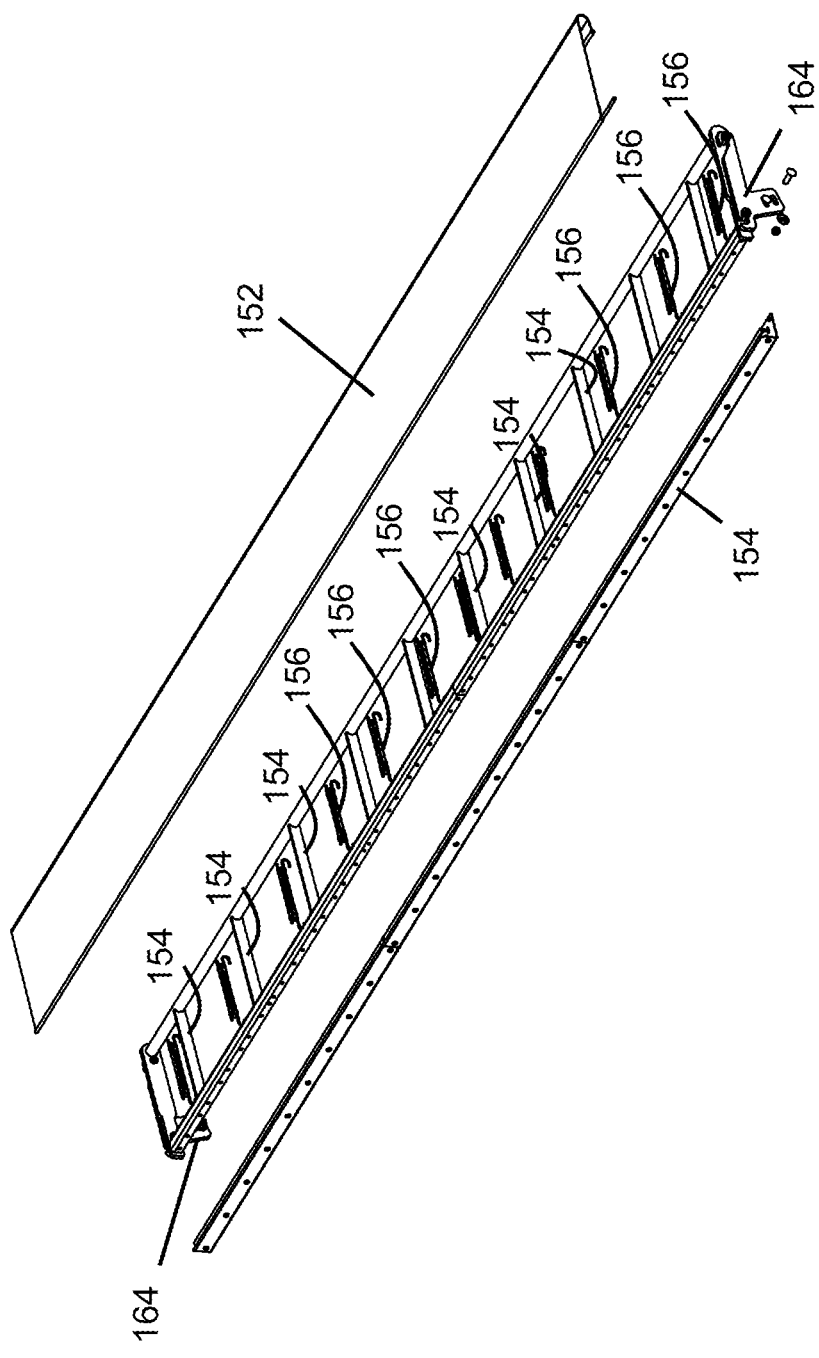
FIG. 19 is an exploded perspective view of the resilient panel assembly shown in FIG. 14.

The flexible soft surface membrane (1004) is made from a resilient lower durometer elastomer material. The membrane (1004) is over molded to the frame (1002). The elastomer material of the membrane (1004) is chemically bonded to the frame (1002). The bonded membrane (1004) therefore attaches directly to the frame (1002) and does not require mechanical fasteners such as clamps, screws or bolts. As shown in FIG. 13, the frame may also include an edge portion (1014) having a reduced thickness compared to the surround portion of the frame (1002). The membrane (1004) is therefore over molded above and below the thin edge portion (1014). In this manner, there is a physical engagement of the membrane (1004) to the edge portion (1014) of the frame as well as chemical bonding of the membrane (1004) to the frame (1002). Moreover, the edge portion (1014) may have spaced apart protrusions (1016) that provide further engagement between the membrane (1004) and the frame (1002). It is appreciated that the elastic membrane (1000) spans the apertures (1006) and is over molded over a portion of the frame (1002) so that a majority of the exposed upper surface of the (1000) catch plate assembly is covered by the elastic membrane (1004).

The apertures (1006) allow the elastic membrane (1004) to act as a trampoline and flex slightly when struck by falling fruit. The membrane and its mounting arrangement provide for resiliency of the membrane (1004) to minimize damage and bruising of fruit falling onto the catching assemblies (1000). The trampoline like membrane (1004) is unsupported at the edges (1014) and is supported solely by the framework (1002) and is therefore able to deflect and stretch from the fruit impact to absorb some of the kinetic energy of the falling fruit. However, the membrane (1004) also provides a receiving surface that has sufficient tautness to allow fruit to roll off the catch plate assemblies (1000) to the conveyors. It can be appreciated that the shape may be varied somewhat as long as the upper surface absorbs some of the energy of the falling fruit and prevents bruising from impact and provides overlap and directs fruit toward the conveyors.

The design of the catchers (1000) eliminates multiple parts and their assembly. Moreover, the elastomer material of the membrane forms a soft trampoline surface that does not require tensioning. The catcher is reversible and can be used as a left side catcher or a right side catcher. This reduces the number of replacement catchers that are needed for maintenance and replacement. The catchers (1000) are made in an efficient molding process that uses lightweight and cost-effective materials. The material for the frame (1002) is placed in mold and then cured. The mold is then reconfigured and a volume proximate the frame corresponding the membrane is formed. The elastomer material is thin introduced into the mold. The elastomer material is then cured and chemically bond to the frame to achieve the catcher assembly (1000).

Referring to FIGS. 15-19, there is shown a tunnel first soft surface assembly, generally designated (150). The tunnel first soft surface assembly (150) includes a thin flexible membrane (152) such as food grade fabric or plastic sheet stretched over a rigid or semi-rigid frame (154). The flexible material (152) may be chemically bonded or mechanically attached to the frame (154). The level of flexibility of the membrane (152) may be changed by adjusting its tension. Changing tension is accomplished through slotted holes on the clamping mechanism (160), or by the use of rope, spring or elastic cord (156), such as bungee cords, having hooks (158) to secure the edges. A pocket may be sewn in to allow a rigid rod or sheet (162) to be inserted and engaged by the hooks (158). Mounting brackets (164) maintain the upper surface of the flexible membrane (152) at a slope, as shown in FIG. 7. As with the catcher assemblies (1000), the slope of the upper surface lessens the impact of fruit falling on the assembly (150) to prevent bruising. One tunnel first soft surface assembly (150) is spaced laterally outward of the rows of the catcher plate assemblies (1000) on the left side of the picking tunnel and a second tunnel first soft surface assembly (150) is spaced laterally outward of the rows of the catcher plate assemblies (1000) on the right side of the picking tunnel and direct fruit downward for transport to be loaded into trays or crates.

Unlike cushion designs with foam that adhere to a rigid substrate, the first soft surface assembly (150) can be easily disassembled for cleaning. Moreover, the first soft surface assembly (150) also has adjustable tension so that the cushioning performance may be optimized. Tension may be easily adjusted by interchanging elastic elements (156) of different lengths and/or different elasticities. Furthermore, rather than replacing the entire assembly (150), the flexible membrane (152) may also be easily replaced should it become worn, tear or have holes.

Figure 20:
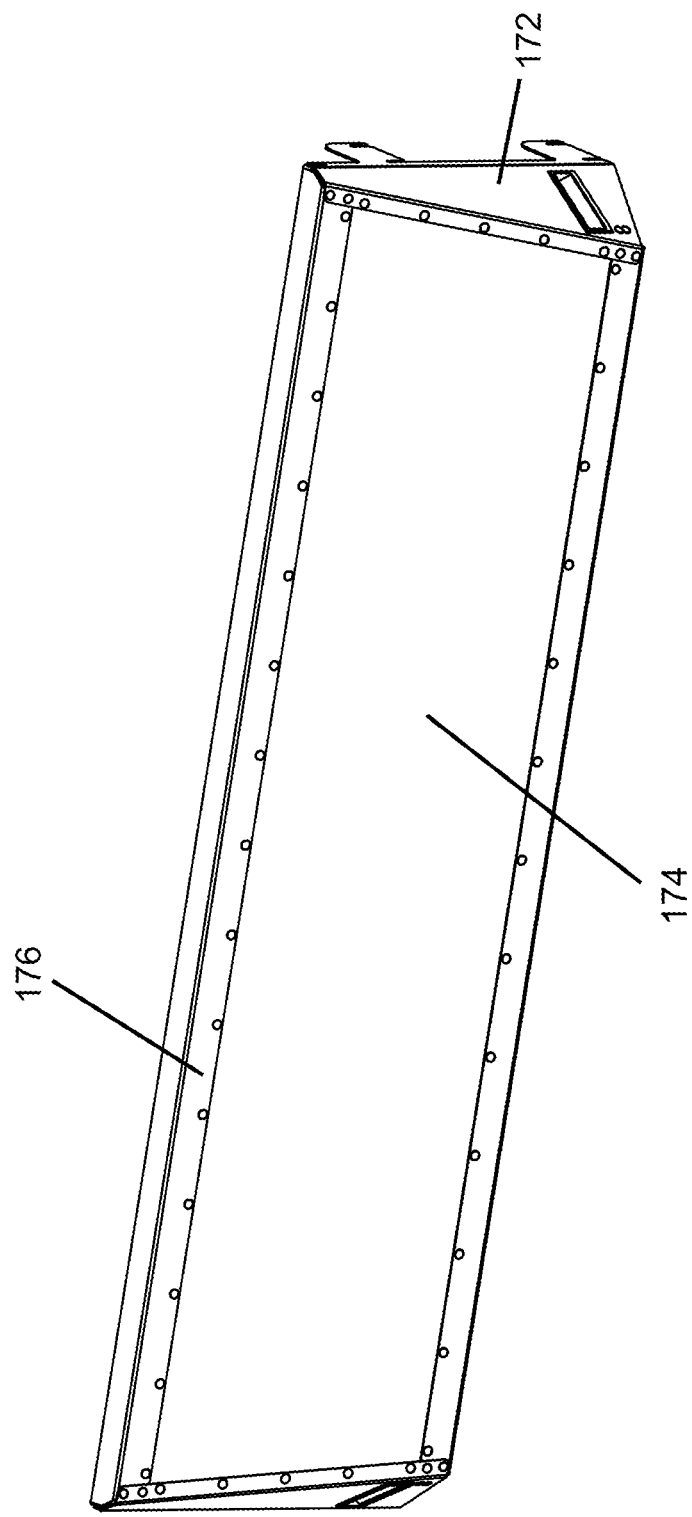
FIG. 20 is a top perspective view of an angled panel assembly for the catching system shown in FIG. 6.
Figure 21:
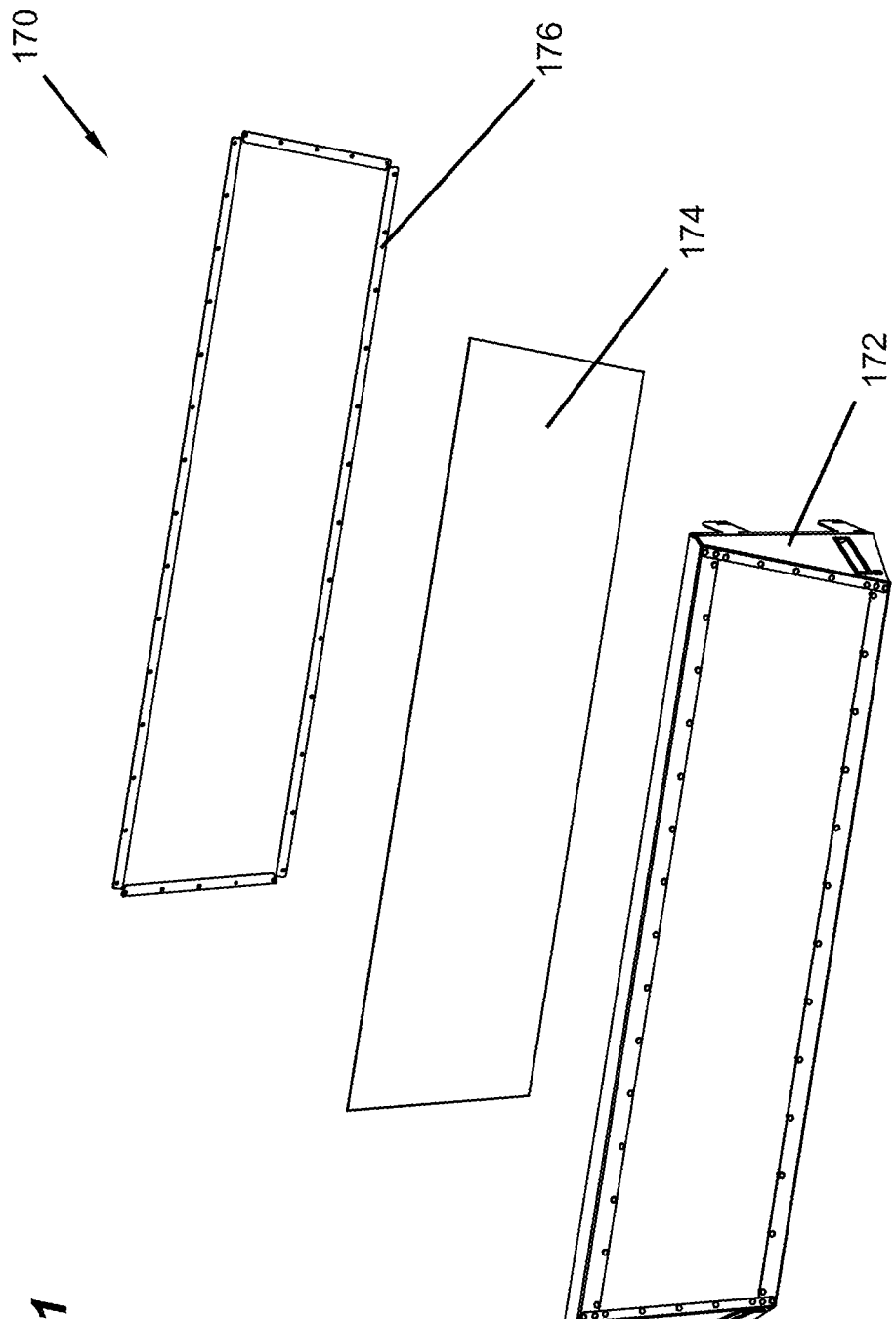
FIG. 21 is an exploded perspective view of the angled panel assembly shown in FIG. 19.
Figure 22:
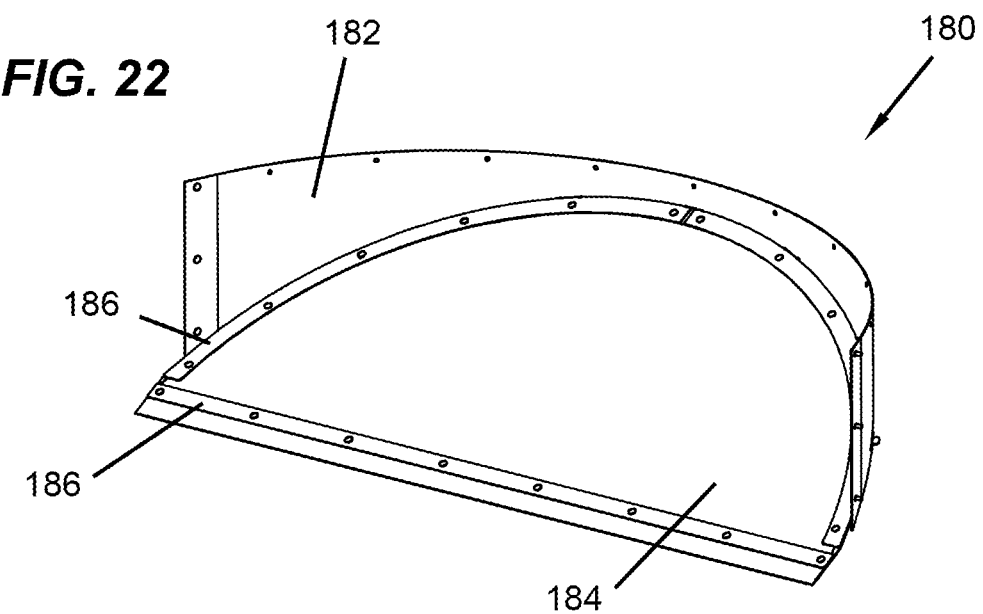
FIG. 22 is a perspective view of an angled drum catch assembly for below the picking heads of the berry harvester shown in FIG. 1.
Figure 23:
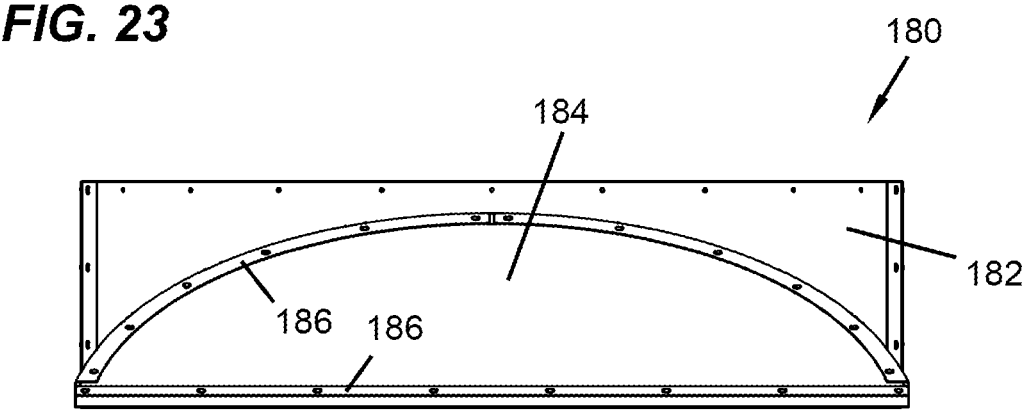
FIG. 23 is a front elevational view of the angled drum catcher assembly shown in FIG. 21.
Figure 24:
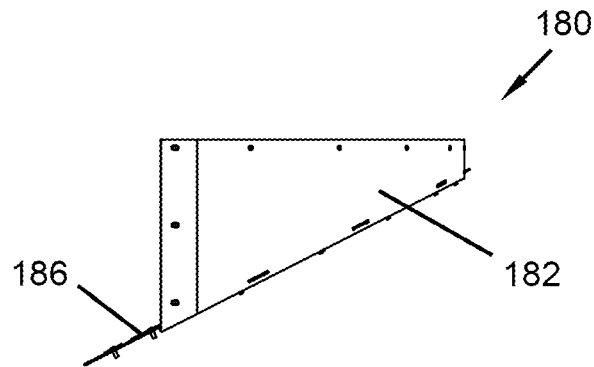
FIG. 24 is a side elevational view of the angled drum catcher assembly shown in FIG. 21.
Figure 25:
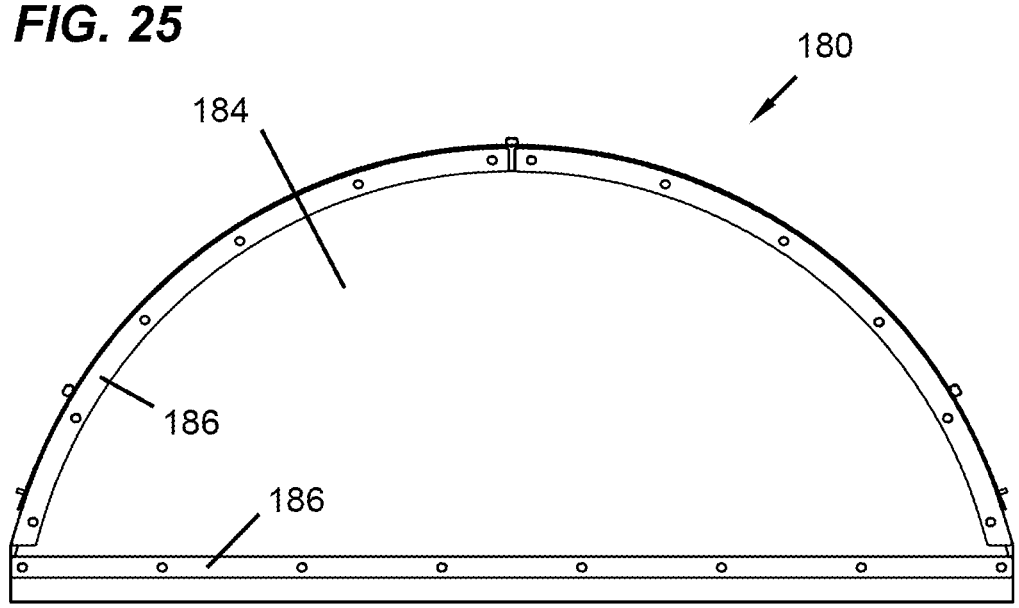
FIG. 25 is a top plan view of the angled drum catcher assembly shown in FIG. 21.
Figure 26:
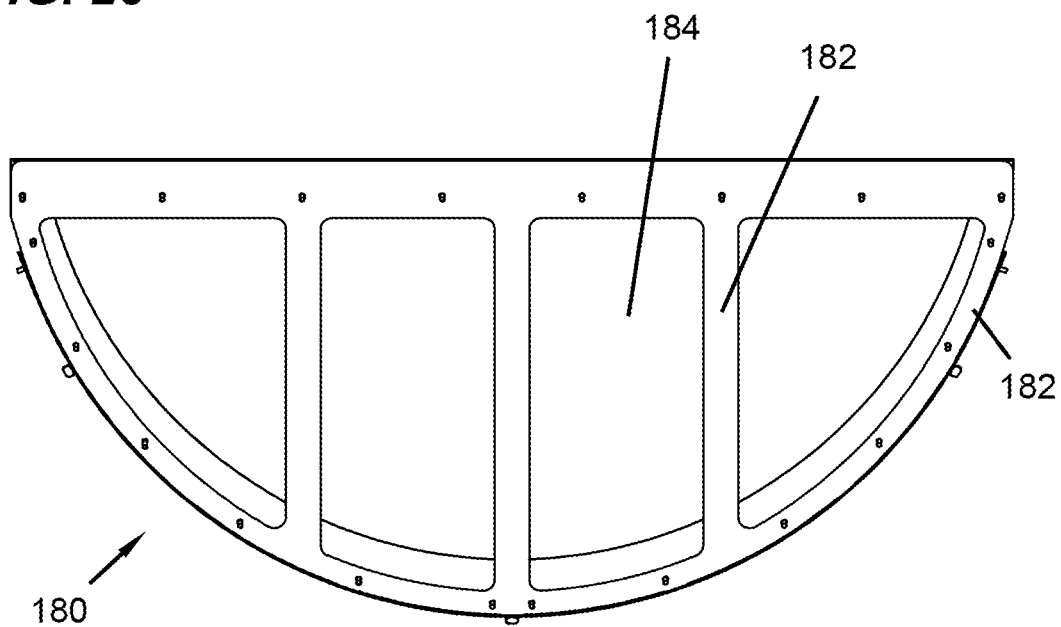
FIG. 26 is a bottom plan view of the angled drum catcher assembly shown in FIG. 21.
Figure 27:
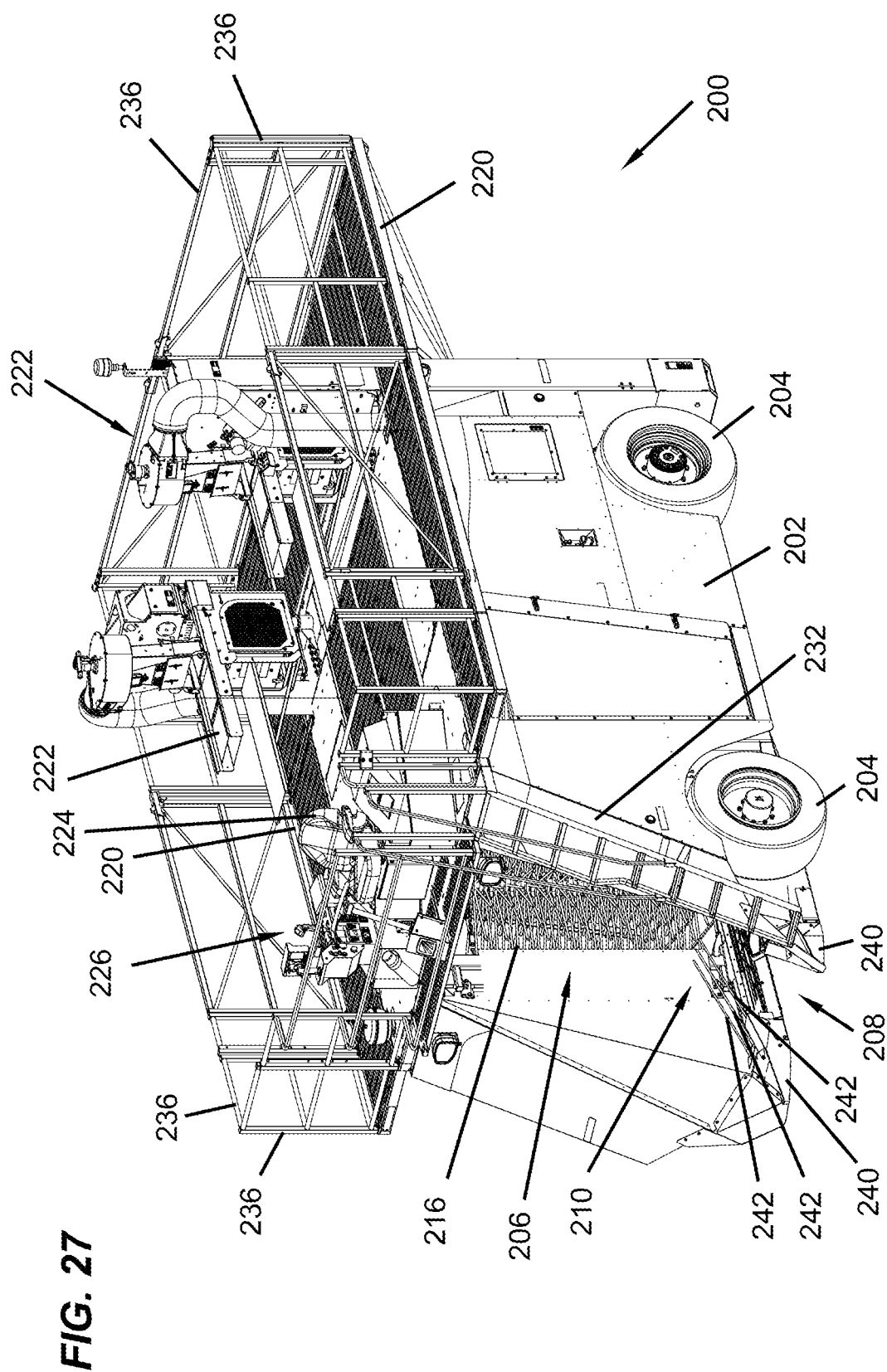
FIG. 27 is a top perspective view of a second embodiment of a berry harvester according to the principles of the present invention.
Figure 28:
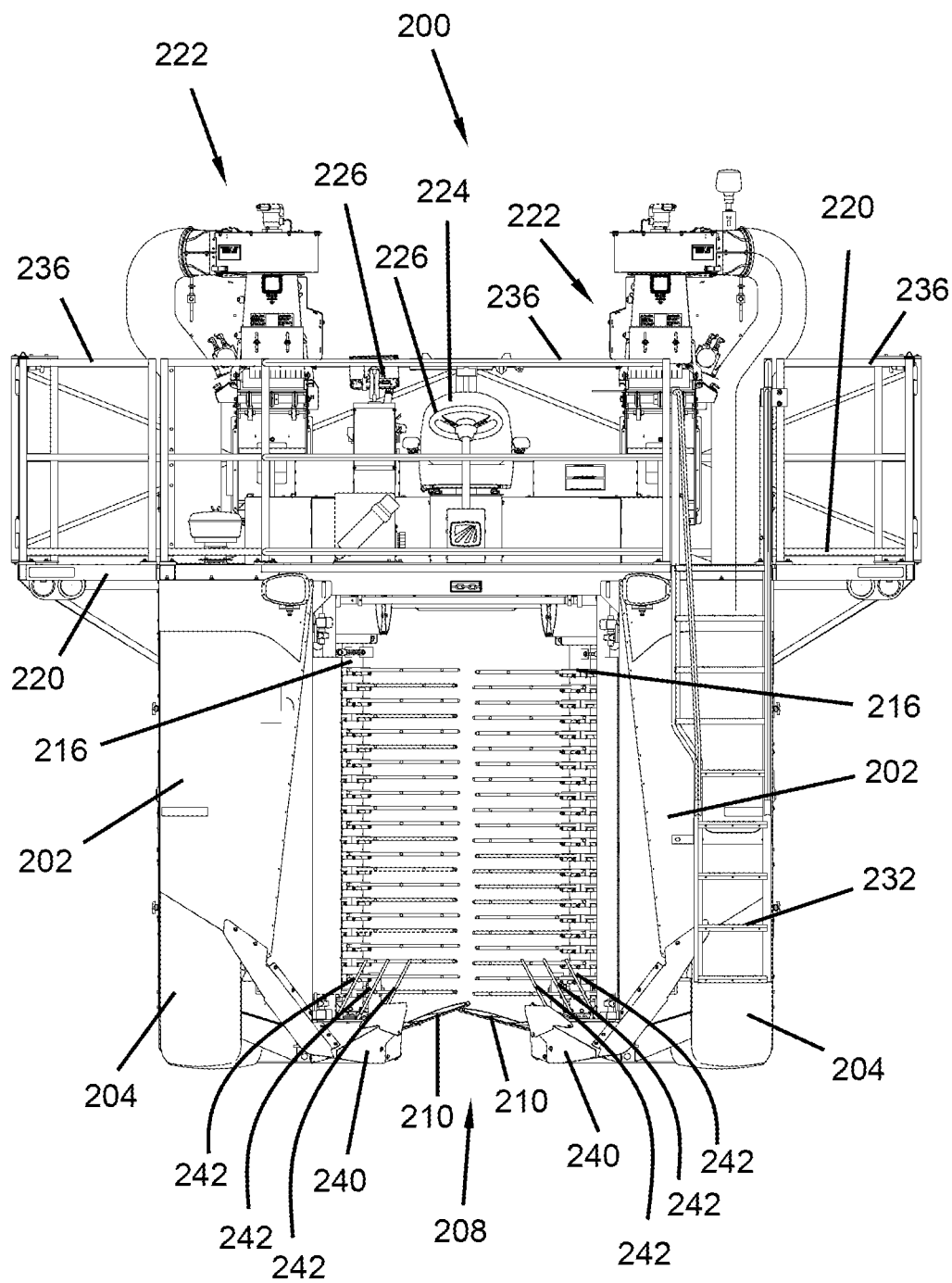
FIG. 28 is a front elevational view of the berry harvester shown in FIG. 27.
Figure 29:
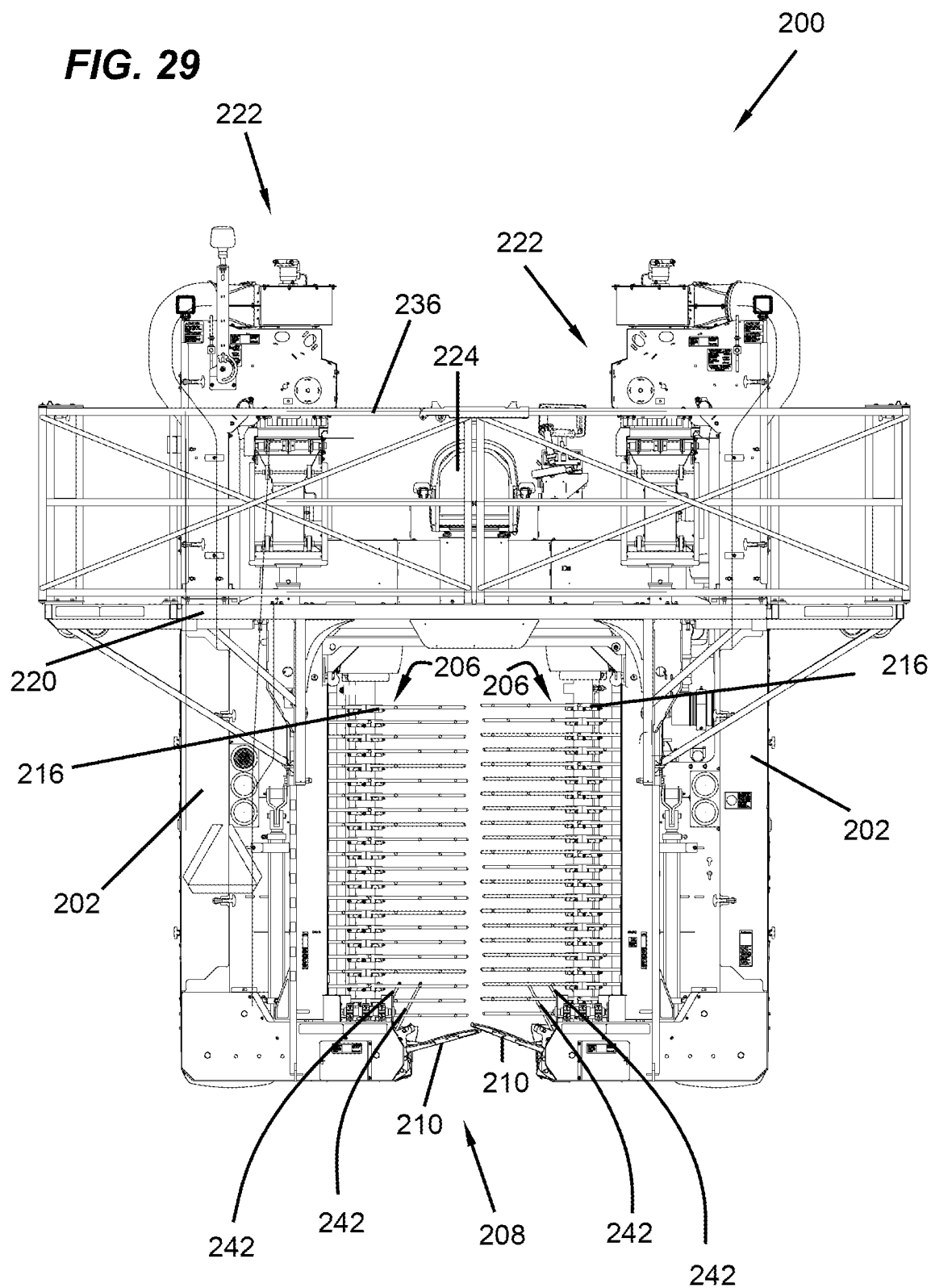
FIG. 29 is a rear elevational view of the berry harvester shown in FIG. 27.
Figure 30:
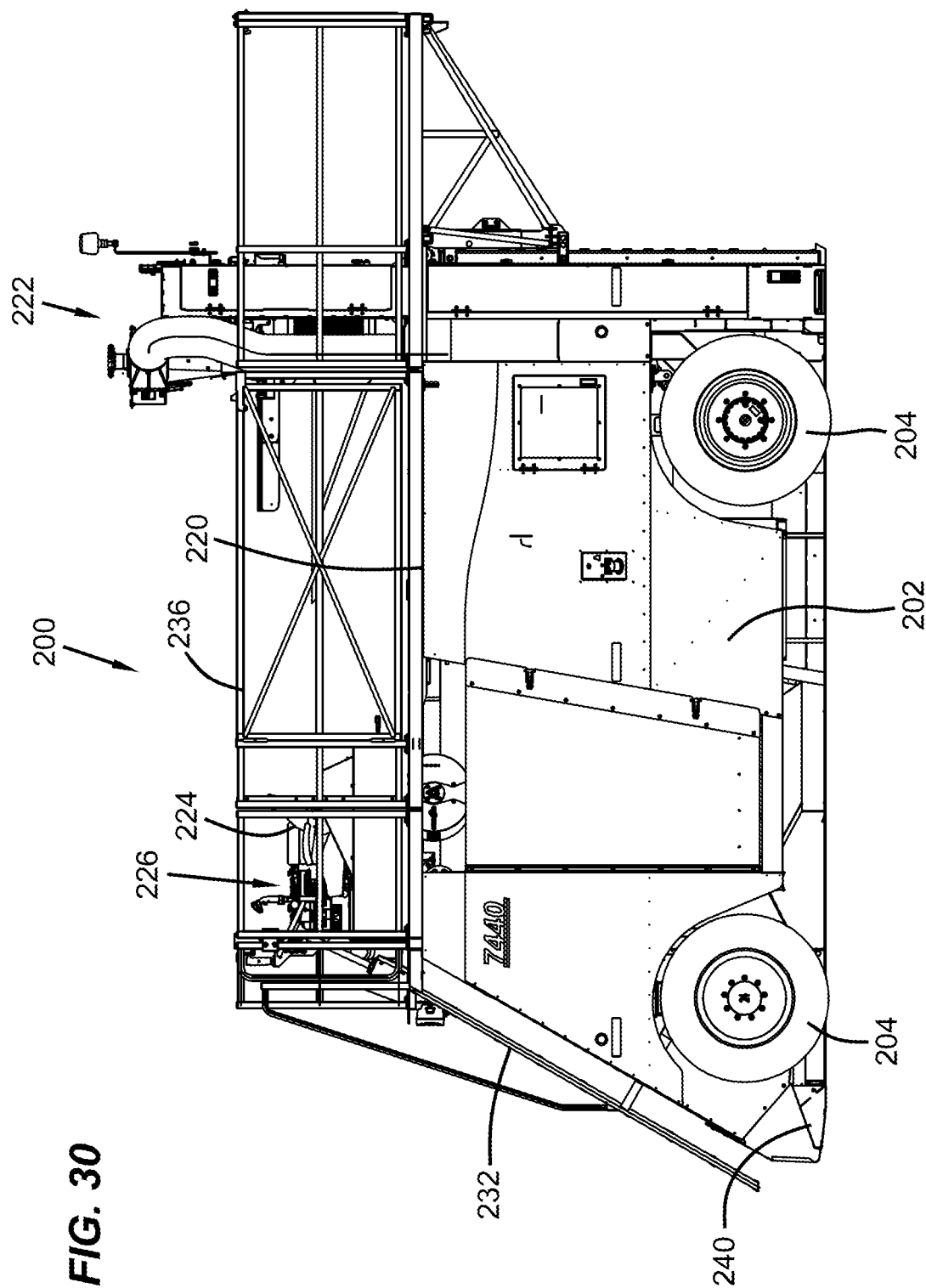
FIG. 30 is a right side view of the berry harvester shown in FIG. 27.
Figure 31:
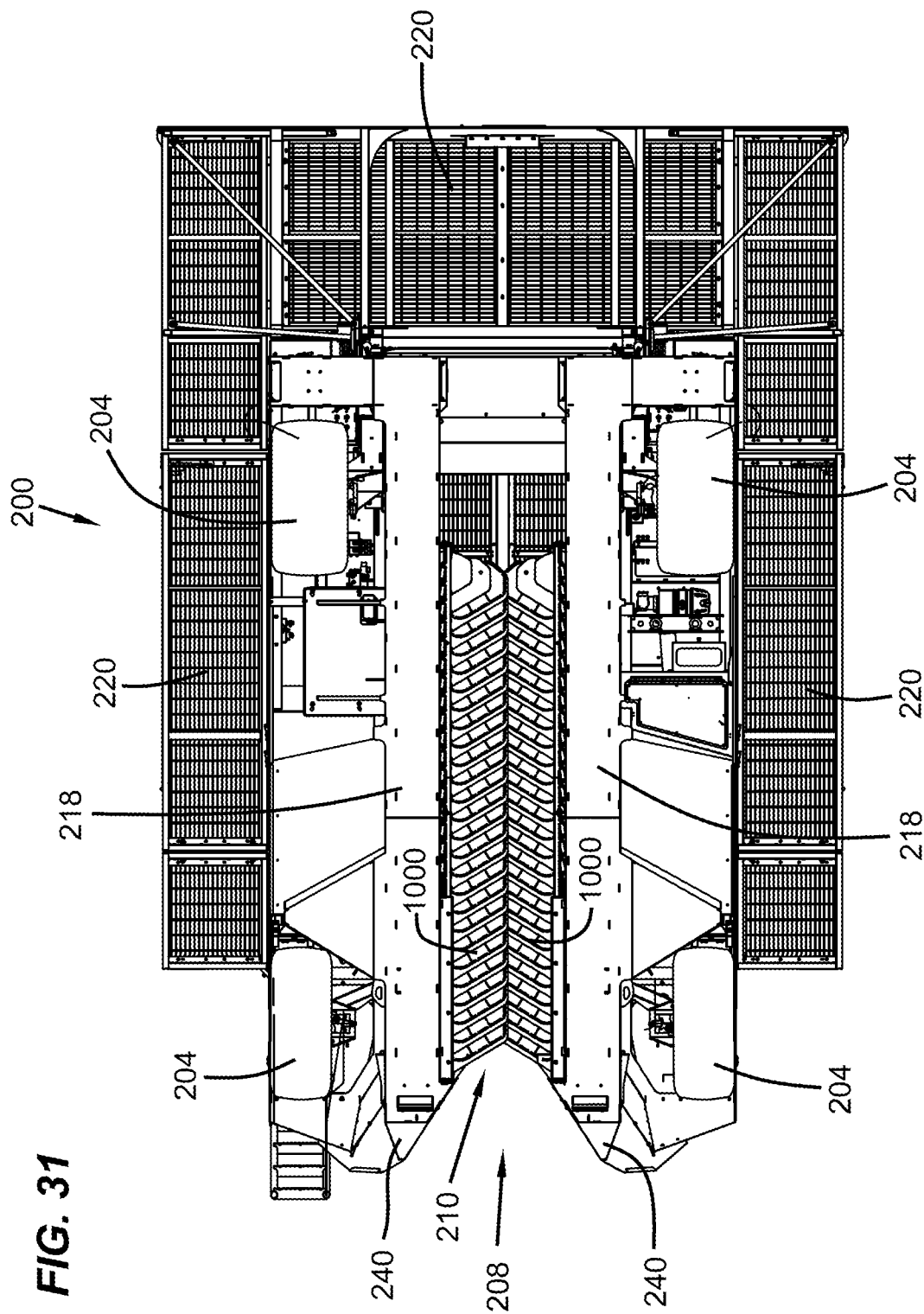
FIG. 31 is a bottom plan view of the berry harvester shown in FIG. 27.

Referring to FIGS. 20 and 21, there is shown a second tunnel soft surface assembly comprising an angled tunnel angled panel assembly, generally designated (170). The tunnel angled panel assembly (170) includes a frame (172) supporting a membrane (174) at edges of the membrane by a trim element (176). The frame (172) positions the upper surface of the membrane (174) at an acute angle relative to the sides of the tunnel (108). Therefore, the membrane (174) requires less cushioning effect than other elements that are sloped, but more horizontal. The membrane (174) is easily replaced by removing the trim element (176) and inserting a new membrane (174). The cushioning effect of the angled tunnel panel assembly (170) may be varied by switching the membrane (174) with a different membrane composed of a different material.

Referring to FIGS. 22-26, there is shown an angled beater panel assembly, generally designated (180). The angled beater panel assembly (180) includes a frame (182) forming a partial cylinder and supporting a membrane (184) at edges of the membrane by trim elements (186). The frame (182) positions the upper surface of the beater membrane (184) at a slope. As the beaters tends to slow falling fruit, less cushioning is needed below the beaters. Therefore, the membrane (184) requires less cushioning effect than other elements. The membrane (184) is easily replaced by removing the trim elements (186) and inserting a new membrane (184). The cushioning effect of the angled beater panel assembly (180) may be varied by switching the membrane (184) with a different membrane (184) made of a different material.

A second embodiment of a fruit harvester according to the present invention is shown in FIGS. 27-31 and generally designated (200). The berry harvester (200) is also an over the row type harvester with a chassis (202) forming a picking tunnel (208). Unlike the harvester (100), the chassis (202) of the berry harvester (200) is supported on four wheels (204). The harvester (200) includes a driver's seat (224) at an upper front portion of the harvester (200). Displays and controls (226) such as switches, a joystick and a steering wheel are easily accessible from the driver's seat (224).

The harvester (200) includes a picking assembly (206) with rotary picking heads (216) having orbital shaking picking battens. Forward of the picking tunnel (208), low profile nose cones (240) provide a transitional surface to help guide the fruiting canes or branches into the harvester tunnel (108). Moreover, cane lifters (242) aid in positioning lower branches of plants and lifting them for engagement by the orbital picking heads (216) for more efficient fruit removal. The fruit removed by the picking assembly (206) falls onto a catching system (210).

The harvester (200) includes a ladder (232) to access a large upper deck (220) provide an area for storage and for workers to fill containers at filling stations (222) at each side of the harvester (200) receiving a conveyor delivering fruit from each side of the picking tunnel (208). The raised decks (220) include railings (236) and may include portions that fold to decrease the width of the harvester (100) for transport or storage.

Figure 32:
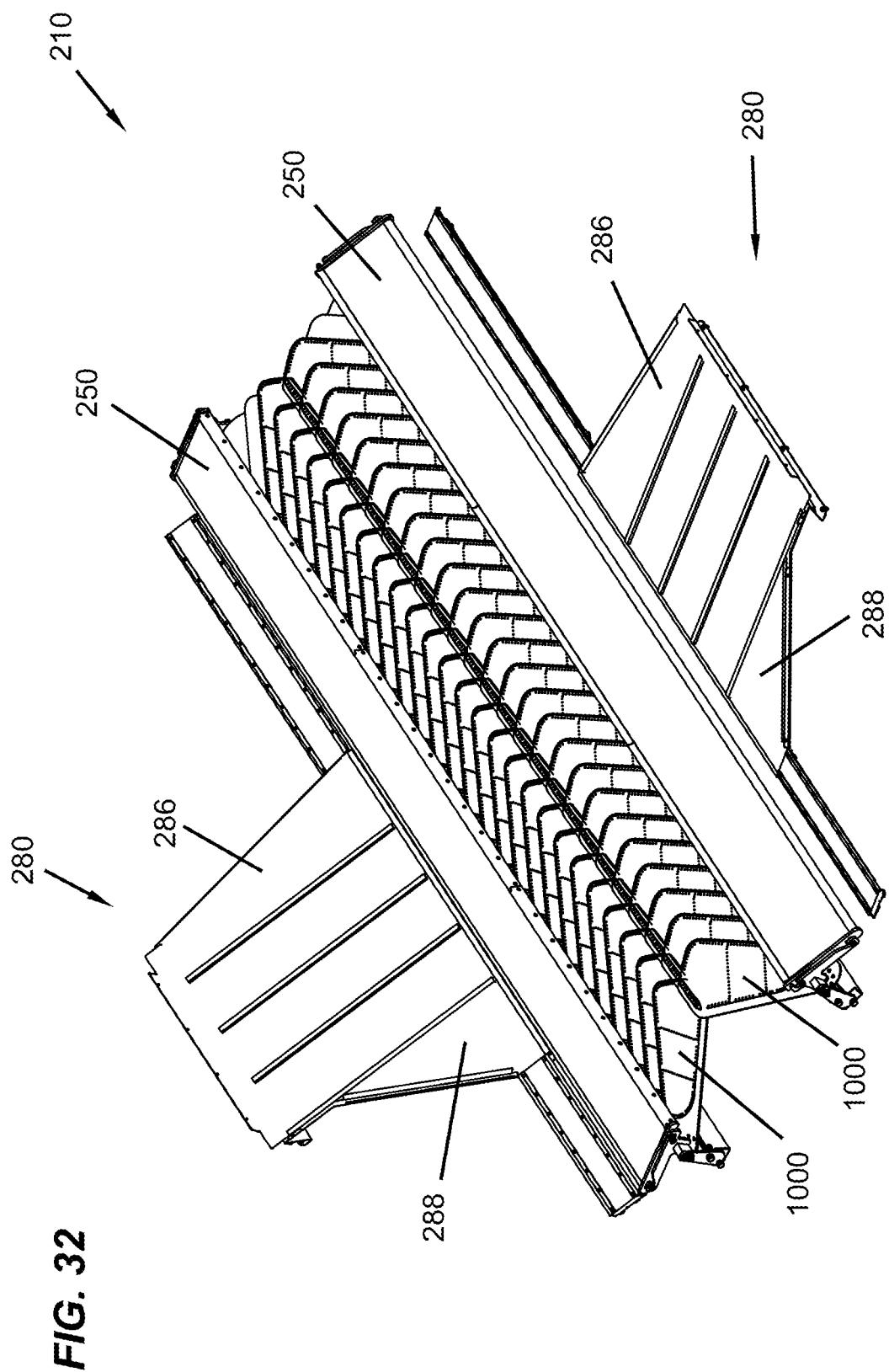
FIG. 32 is a front right perspective view of a catching system for the berry harvester shown in FIG. 27.

As shown in FIG. 32, the structures of the catching system (210) in the picking tunnel (208) are similar to the structures of harvester (100). The catching system (210) of the harvester (200) includes a series of catch plate assemblies (1000) on each side of the tunnel above conveyors (218). The catching system (210) also includes a soft surface assembly (250) on each side of the tunnel (208).

Figure 33:
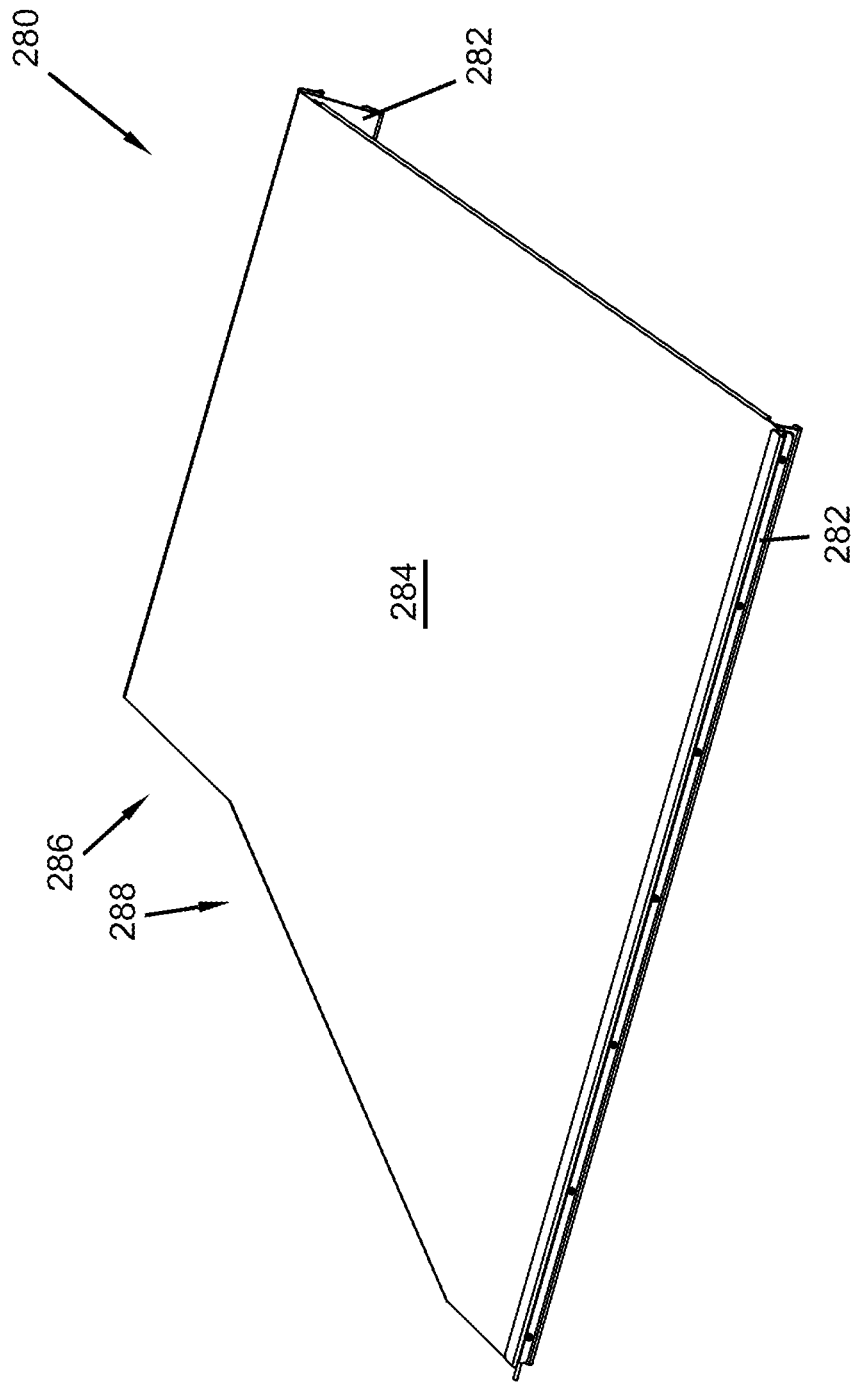
FIG. 33 is a top perspective view of an angled catch assembly for below the picking heads of the catching system shown in FIG. 32.
Figure 34:
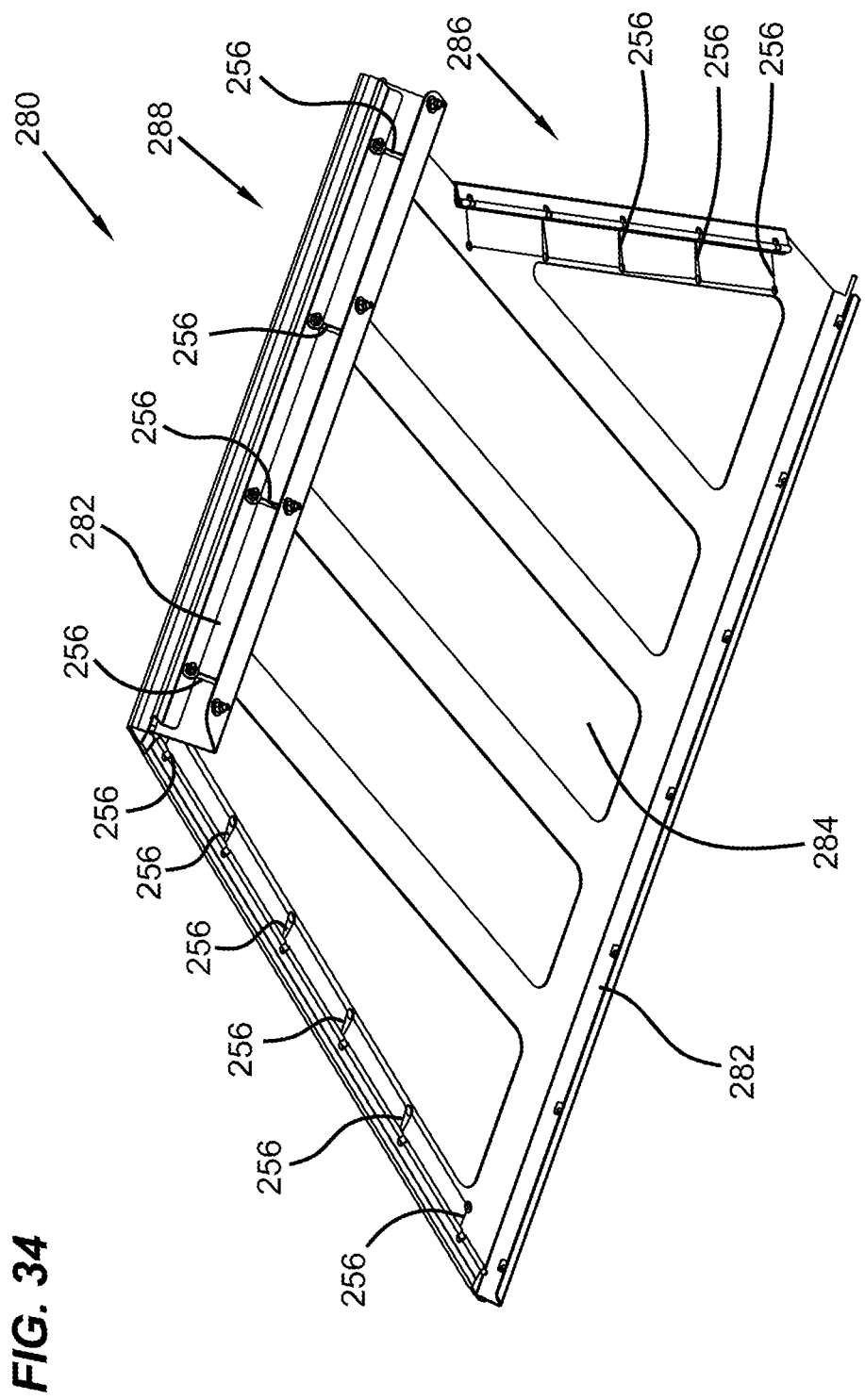
FIG. 34 is a bottom perspective view of the angled catch assembly shown in FIG. 32.

Referring to FIGS. 33 and 34, each soft surface assembly (250) includes a thin flexible membrane (252) stretched over a rigid or semi-rigid frame (254). However, the columns housing the picking heads (216) of the harvester (200) have a different cross section than that of each column of the harvester (100). An angled beater panel assembly (280) includes a membrane (284) stretched over a frame (282). However, rather than forming a somewhat semi-circular assembly, the angled beater panel assembly (280) has a somewhat trapezoidal portion (286) with an added tapered portion (288) extending from one end. The membrane (284) is retained and tensioned by engagement at edges with ropes, springs or elastic cords (256) having hooks (258). The frame (282) positions the upper surface of membrane (284) at a slope. As the beaters tend to slow the descent of falling fruit, less cushioning is needed below the beaters. Therefore, the membrane (284) requires less cushioning effect than other cushioned surfaces. The membrane (284) is easily replaced by removing the hooks (256) of the elastic cords (258) and attaching a new membrane (284). The cushioning effect of the angled beater panel assembly (280) may be varied by switching the membrane (284) with a different membrane (284) made of a different material.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An over the row fruit harvester, comprising:
a chassis defining a picking tunnel;
a picking system configured to remove fruit from plants;
a catching system in the picking tunnel configured to receive fruit removed from the plants, the catching system comprising:
  a plurality of resilient catcher assemblies on each side of the picking tunnel, each of the catcher assemblies at least partially overlapping adjacent catcher assemblies, each of the catcher assemblies being positioned with a sloping upper surface, the catcher assemblies flexing upon impact by falling fruit; each catcher assembly comprising:
    a substantially planar framework forming an aperture and having a mounting section;
    a membrane of elastomeric material directly over molded to the framework, the membrane extending across the aperture, the membrane being supported solely by the framework;
  wherein the picking system comprises a pair of opposed columns of beaters, and wherein the catching system further comprises a beater soft surface assembly below each of the columns of beaters and having a partial cylinder shape with a resilient panel extending across an upper surface of the beater soft surface assembly, the resilient panel being sloped and supported at edges by a beater soft surface assembly frame; and
  a tunnel second soft surface assembly proximate each side of the picking tunnel and having a resilient panel extending across an upper surface of the tunnel second soft surface assembly, the resilient panel being sloped and supported at edges by a tunnel second soft surface assembly frame, wherein the tunnel soft surface assembly frame is removable and wherein cushioning of the tunnel second soft surface assembly is adjustable by interchanging the resilient panel with a different panel with different cushioning.

2. The over the row fruit harvester according to claim 1, wherein the planar framework of each of the catcher assemblies comprises a monolithic frame element.

3. An over the row fruit harvester, comprising:
a chassis defining a picking tunnel;
a picking system configured to remove fruit from plants;
a catching system in the picking tunnel configured to receive fruit removed from the plants, the catching system comprising:
  a plurality of resilient catcher assemblies on each side of the picking tunnel, each of the catcher assemblies at least partially overlapping adjacent catcher assemblies, each of the catcher assemblies being positioned with a sloping upper surface, the catcher assemblies flexing upon impact by falling fruit; each catcher assembly comprising:
    a substantially planar framework forming an aperture and having a mounting section;
  a membrane bonded to the framework, the membrane extending across the aperture, the membrane being formed of an elastomeric material supported solely by the framework;
  a first soft surface assembly on each side of the picking tunnel laterally outward from the catcher assemblies, each of the first soft surface assemblies comprising a first soft surface membrane stretched between opposed supports and supported at edges of the first soft surface membrane by the opposed supports;
  a second soft surface assembly proximate each side of the picking tunnel and having a resilient panel extending across an upper surface of the second soft surface assembly, the resilient panel being sloped and supported at edges by a second soft surface assembly frame, wherein the tunnel second soft surface assembly frame is removable and wherein cushioning of the tunnel second soft surface assembly is adjustable by interchanging the resilient panel with a different panel with different cushioning;
wherein the picking system comprises a pair of opposed columns of beaters; and
wherein the catching system further comprises a beater soft surface assembly below each of the columns of beaters and having a partial cylinder shape with a resilient panel extending across an upper surface of the beater soft surface assembly, the resilient panel being sloped and supported at edges by a beater soft surface assembly frame.

4. A fruit catching system for a fruit harvester, the fruit catching system comprising:
a first row of overlapping catcher assemblies and a second row of overlapping catcher assemblies, the first row of overlapping catcher assemblies and the second row of overlapping catcher assemblies defining a passage for receiving plants to be harvested as the harvester travels; each of the catcher assemblies comprising:
a planar frame forming an aperture;
a membrane comprising a resilient elastomeric material directly over molded to the frame, the resilient elastomeric material extending across the aperture and an upper surface of the planar framework, the membrane being supported solely by the framework; and
a mounting portion;
wherein each of the catcher assemblies is reversible and is configurable and interchangeable as a left side catcher or a right side catcher, wherein a first face of the elastomer material of the catcher assemblies in the first row of catcher assemblies faces upward, and an opposite face of the elastomer material of the catcher assemblies in the second row of catcher assemblies faces upward.

5. The fruit catching system according to claim 4, wherein the planar framework comprises a monolithic frame element.

6. The fruit catching system according to claim 4, wherein the planar framework comprises an edge portion of reduced thickness surround the aperture.

7. The fruit catching system according to claim 6, wherein the resilient elastomeric material extends on opposed faces of the edge portion of reduced thickness.

8. The fruit catching system according to claim 4, wherein the frame defines a plurality of the apertures and wherein the resilient elastomeric material extends across the plurality of apertures.

9. A catch plate assembly for a fruit harvester consisting of:
a substantially planar catch plate frame having a first face and a second face configured for attaching to a pivotal mount, the catch plate frame forming an aperture extending from the first face to the second face, wherein the planar catch plate frame comprises an edge portion of reduced thickness surrounding the aperture;
a membrane of elastomeric material extending over the aperture and a portion on opposed faces of the edge portion of reduced thickness of the catch plate frame, the membrane of elastomeric material having a physical engagement to the catch plate frame and being chemically bonded directly to the catch plate frame;
wherein the membrane of elastomeric material is directly over molded to the catch plate frame;
wherein the catch plate assembly is reversible and is configurable as a left side catcher or a right side catcher, wherein a first face of the membrane of elastomeric material faces upward as a left side catcher and an opposite face of the membrane of elastomeric material faces upward as a right side catcher.

10. An over the row fruit harvester comprising:
opposed picking assemblies;
a chassis defining a picking tunnel;
a first group of catch plate assemblies comprising a plurality of first catch plate assemblies, each of the plurality of first catch plate assemblies being pivotally mounted and overlapping adjacent first catch plate assemblies;
a second group of catch plate assemblies comprising a plurality of second catch plate assemblies, each of the plurality of second catch plate assemblies being pivotally mounted and overlapping adjacent second catch plate assemblies;
the first group of catch plate assemblies being positioned on a first side of the picking tunnel and extending inward toward and along a centerline of the picking tunnel and the second group of catch plate assemblies being positioned on a second side of the picking tunnel opposite the first side of the picking tunnel and extending inward toward and along the centerline of the picking tunnel;
wherein each of the catch plate assemblies is reversible and is configurable and interchangeable in the first group of catch plate assemblies or in the second group of catch plate assemblies, wherein a first face of the elastomer material of the catch plate assemblies in the first group of catch plate assemblies faces upward, and an opposite face of the elastomer material of the catch plate assemblies in the second group of catch plate assemblies faces upward;
a left first soft surface assembly extending along and spaced laterally outward in the picking tunnel from the first group of catch plate assemblies; the first soft surface assembly having a sloping upper surface comprising a membrane supported at edges of the membrane;
a right first soft surface assembly extending along and spaced laterally outward in the picking tunnel from the second group of catch plate assemblies;
wherein the left first soft surface assembly and the right first soft surface assembly have a sloping upper surface comprising a membrane supported at edges of the membrane:
a tunnel second soft surface assembly proximate each side of the picking tunnel and having a resilient panel extending across an upper surface of the tunnel second soft surface assembly, the resilient panel being sloped and supported at edges by a tunnel second soft surface assembly frame, wherein the tunnel soft surface assembly frame is removable and wherein cushioning of the tunnel second soft surface assembly is adjustable by interchanging the resilient panel with a different panel with different cushioning.

11. The over the row fruit harvester according to claim 10, wherein the picking assemblies comprise a pair of opposed columns of beaters, the harvester further comprising a second soft surface assembly below each of the columns of beaters and having a resilient panel extending across an upper surface of the second soft surface assembly, the resilient panel being sloped and supported at edges by a second soft surface assembly frame.

12. The over the row harvester according to claim 1, wherein a connection between the elastomeric material and the frame consists of the elastomeric material chemically bonded directly to the frame.

13. The catch plate assembly according to claim 9, wherein a connection between the membrane and the catch plate frame consists of a direct chemical bond between the elastomeric material and the catch plate frame.

* * * * *